(12) United States Patent
Dalton

(10) Patent No.: US 12,355,771 B2
(45) Date of Patent: Jul. 8, 2025

(54) AUDITABLE AND TAMPER-RESISTANT REMOTE ZERO TRUST ACCESS

(71) Applicant: Raytheon Company, Arlington, VA (US)

(72) Inventor: Jack C. Dalton, Shrewsbury, MA (US)

(73) Assignee: Raytheon Company, Arlington, VA (US)

( * ) Notice: Subject to any disclaimer, the term of this patent is extended or adjusted under 35 U.S.C. 154(b) by 379 days.

(21) Appl. No.: 17/685,369

(22) Filed: Mar. 2, 2022

(65) Prior Publication Data

US 2023/0034771 A1    Feb. 2, 2023

Related U.S. Application Data

(60) Provisional application No. 63/226,982, filed on Jul. 29, 2021.

(51) Int. Cl.
    *H04L 9/40*    (2022.01)
    *H04L 67/104*    (2022.01)
    *H04L 67/562*    (2022.01)

(52) U.S. Cl.
    CPC ........ *H04L 63/102* (2013.01); *H04L 63/0876* (2013.01); *H04L 63/105* (2013.01); *H04L 67/104* (2013.01); *H04L 67/562* (2022.05)

(58) Field of Classification Search
    CPC . H04L 63/102; H04L 63/0876; H04L 63/105; H04L 67/104; H04L 67/562
    USPC .......................................................... 726/4
    See application file for complete search history.

(56) References Cited

U.S. PATENT DOCUMENTS

| | | |
|---|---|---|
| 10,116,633 B2 | 10/2018 | Adams |
| 10,404,454 B1 | 9/2019 | Rodriguez De Castro |
| 10,755,241 B2 | 8/2020 | Langschaedel et al. |
| 10,771,243 B1 | 9/2020 | Pasquali et al. |

(Continued)

OTHER PUBLICATIONS

"Amazon Receives FCC Approval for Project Kuiper Satellite Constellation", [Online]. Retrieved from the Internet: https: www.aboutamazon.com news company-news amazon-receives-fcc-approval-for-project-kuiper-satellite-constellation, (Jul. 2020), 3 pgs.

(Continued)

*Primary Examiner* — Catherine Thiaw
*Assistant Examiner* — Nega Woldemariam
(74) *Attorney, Agent, or Firm* — Schwegman Lundberg & Woessner, P.A.

(57) ABSTRACT

A routing service, associated with a peer-to-peer blockchain network, receives data from a computer device, and executes policy decisions regarding access to a resource. A connection management broker receives data from the routing service, and executes policy enforcement regarding access to the resource, thereby providing access to the resource via an implicit trust zone. The connections among the computer device, distributed cloud-based access control, authentication, and routing service, and the connection management broker comprise an untrusted zone. The routing service has no access or visibility to the resource. Upon roaming by the computer device or the connection management broker across multiple access points, statuses are provided by the computer device, the connection management broker, and the routing service.

13 Claims, 22 Drawing Sheets

(56) References Cited

U.S. PATENT DOCUMENTS

| | | | |
|---|---|---|---|
| 10,850,202 B1 | 12/2020 | Koch et al. | |
| 10,861,095 B1 | 12/2020 | Koch et al. | |
| 10,878,389 B2 | 12/2020 | Shtylman et al. | |
| 10,887,104 B1 | 1/2021 | Jayachandran et al. | |
| 10,897,351 B1 | 1/2021 | Kirchhof et al. | |
| 10,911,407 B1 | 2/2021 | Warburton et al. | |
| 10,938,594 B1 | 3/2021 | Jain et al. | |
| 10,939,295 B1 | 3/2021 | Avetisov et al. | |
| 10,939,405 B1 | 3/2021 | Haleem et al. | |
| 2008/0060051 A1* | 3/2008 | Lim .................. | H04L 67/535 726/1 |
| 2013/0268997 A1* | 10/2013 | Clancy, III .......... | H04L 63/0227 726/1 |
| 2018/0322597 A1* | 11/2018 | Sher .................. | G06Q 50/163 |
| 2019/0058709 A1* | 2/2019 | Kempf ................ | G06F 21/64 |
| 2019/0334886 A1* | 10/2019 | Lelcuk .................... | H04L 9/50 |
| 2020/0007315 A1* | 1/2020 | Vouk .................. | H04L 9/0637 |
| 2020/0120039 A1* | 4/2020 | Tabares ............... | H04L 47/783 |
| 2020/0204557 A1* | 6/2020 | Singh .................. | H04L 67/306 |
| 2020/0280541 A1* | 9/2020 | Walker ................. | H04L 63/083 |
| 2020/0280851 A1* | 9/2020 | Sethi ................... | H04L 9/3268 |
| 2021/0037060 A1* | 2/2021 | Robison .............. | H04L 63/123 |
| 2021/0089673 A1* | 3/2021 | Takahashi ............ | H04L 9/3239 |
| 2021/0152529 A1* | 5/2021 | Ruppin ................ | H04L 63/20 |
| 2021/0160252 A1* | 5/2021 | Qiu ..................... | H04L 67/565 |
| 2023/0034771 A1* | 2/2023 | Dalton ................ | H04L 67/562 |

OTHER PUBLICATIONS

"IEEE Standard for Data Format for Blockchain Systems", IEEE, (Dec. 2020), 32 pgs.

"Delay Disruption Tolerant Networking", [Online]. Retrieved from the Internet: https: www.nasa.gov communicating-with-missions delay-disruption-tolerant-networking , (Sep. 2020), 6 pgs.

"Embracing a Zero Trust Security Model", [Online]. Retrieved from the Internet: https: media.defense.gov 2021 Feb 25 2002588479 -1 -1 0 CSI_EMBRACING_ZT_SECURITY_MODEL_UOO115131-21.PDF, (Feb. 2021), 7 pgs.

"OneWeb Internet Access Everywhere for Everyone", [Online]. Retrieved from the Internet: https: web.archive.orgweb 20200320070556 https: www.oneweb.world assets news media OWCorporateBrochure2020.pdf, (2020), 23 pgs.

"Application for Blanket Licensed Earth Stations in Motion", [Online]. Retrieved from the Internet: https: fcc. report IBFS SES-LIC-INTR2021-00934 3877177.pdf, (2020), 10 pgs.

Balakrishnan, Hari, "Mosh An Interactive Remote Shell for Mobile Clients", USENIX Annual Technical Conference, (Jun. 2012), 12 pgs.

Bartock, Mike, "5G Cybersecurity Preparing a Secure Evolution to 5G", National Institute of Standards and Technology The National Cybersecurity Center of Excellence, (Apr. 2020), 23 pgs.

Cannell, Jake S., "Orchid A Decentralized Network Routing Market", [Online]. Retrieved from the Internet: https: academy.bit2me. com wp-content uploads 2021 11 orchid-oxt-whitepaper-english. pdf, (Nov. 2019), 47 pgs.

Conrad, Bernd, "A Survey on Tor and I2P", The Ninth International Conference On Internet Monitoring and Protection, (2014), 7 pgs.

Dingledine, Roger, "Tor The Second-Generation Onion Router", Proceedings of the 13th USENIX Security Symposium, (Aug. 2004), 18 pgs.

Donenfeld, Jason A., "WireGuard Next Generation Kernel Network Tunnel", [Online]. Retrieved from the Internet: https: www.wireguard. com papers wireguard.pdf, (Jun. 2020), 20 pgs.

Lesavre, Loic, "Blockchain Networks Token Design and Management Overview", National Institute of Standards and Technology, (Feb. 2021), 84 pgs.

Rose, Scott, "Zero Trust Architecture", National Institute of Standards and Technology, (Aug. 2020), 59 pgs.

Spear, Batz, "BeyondCorp The Access Proxy", [Online]. Retrieved from the Internet: https: research.google pubs beyondcorp-the-access-proxy , (2016), 4 pgs.

* cited by examiner

AUDITABLE AND TAMPER-RESISTANT REMOTE ZERO TRUST ACCESS

RELATED APPLICATIONS

This patent application claims the benefit of and priority to U.S. Provisional Patent Application No. 63/226,982, filed Jul. 29, 2021, which is incorporated by reference herein in its entirety.

TECHNICAL FIELD

Embodiments described herein generally relate to auditable and tamper-resistant remote zero trust access.

BACKGROUND

Compromised elements, nodes, and services present an attack vector for lateral traversal elsewhere within a traditional network. Remotely accessible nodes have an elevated risk potential that any initial network penetration will provide a foothold for the attacker to pivot elsewhere, deeper within the network, beyond the initial compromise.

Existing access technologies have capability shortfalls and/or attempt to solve for tangential problem sets, which make them less suitable. Examples of existing access technologies include technologies with a tangential objective, such as the assurance of anonymous communications and/or anti-censorship (e.g., Invisible Internet Project (I2P), Orchid, and Tor). Another example is narrowly-scoped networking technologies with capability gaps, such as dynamic scalability (e.g., VPLS) or incompatibility with both endpoints simultaneously roaming (e.g., VPN). A third example are solutions reliant on monolithic service architectures that preclude or impede further subdivision into nested enclaves or isolated domains, such as by retaining implicit trust for internal enterprise-wide authentication and access control services (e.g., BeyondCorp).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
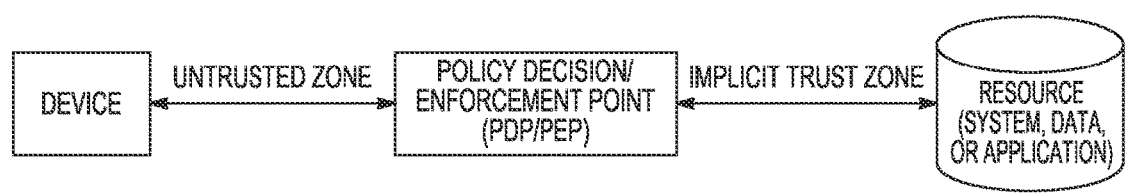
FIG. 1 illustrates an example of a zero trust access problem.
Figure 2:
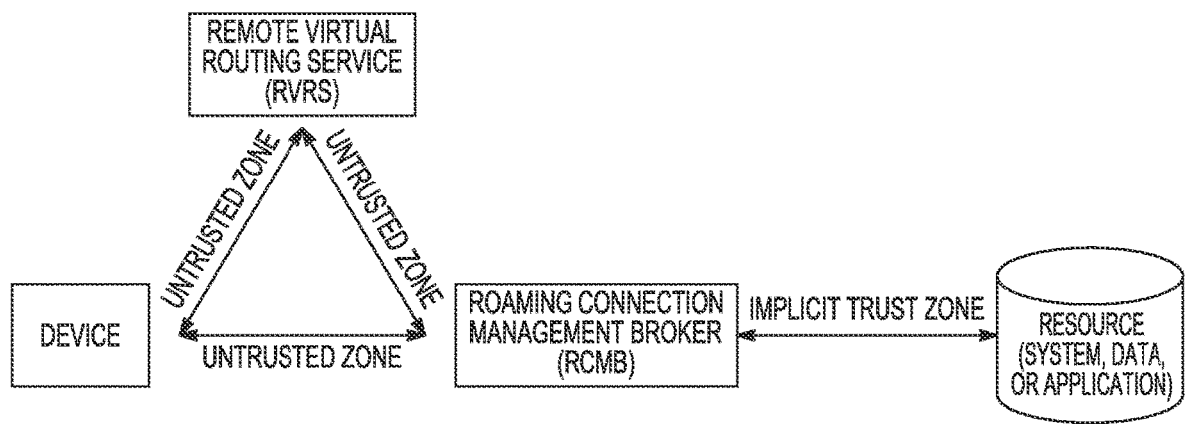
FIG. 2 is a block diagram of an embodiment illustrating a zero trust access system.
Figure 3:
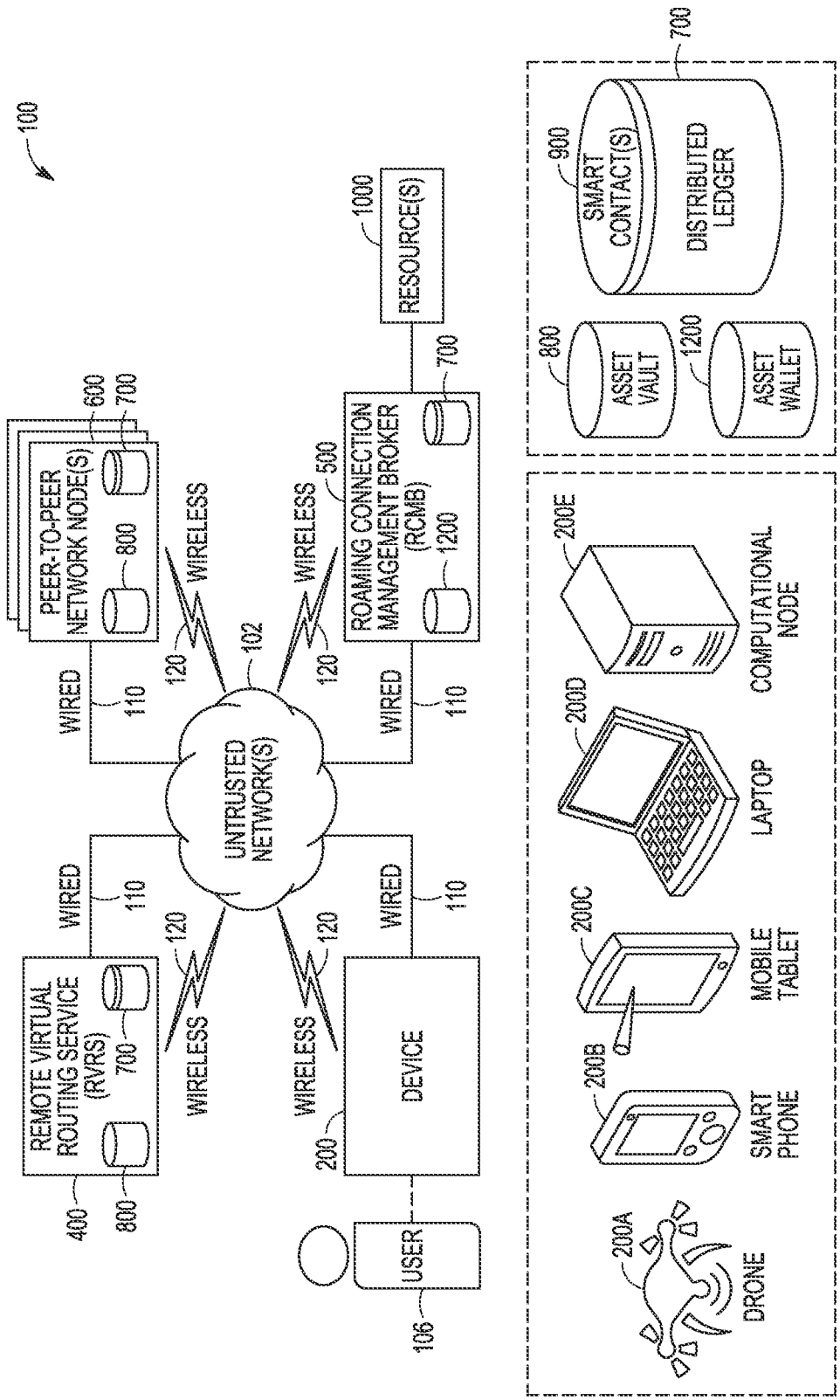
FIG. 3 is a block diagram of another embodiment illustrating a zero trust access system.
Figure 4:
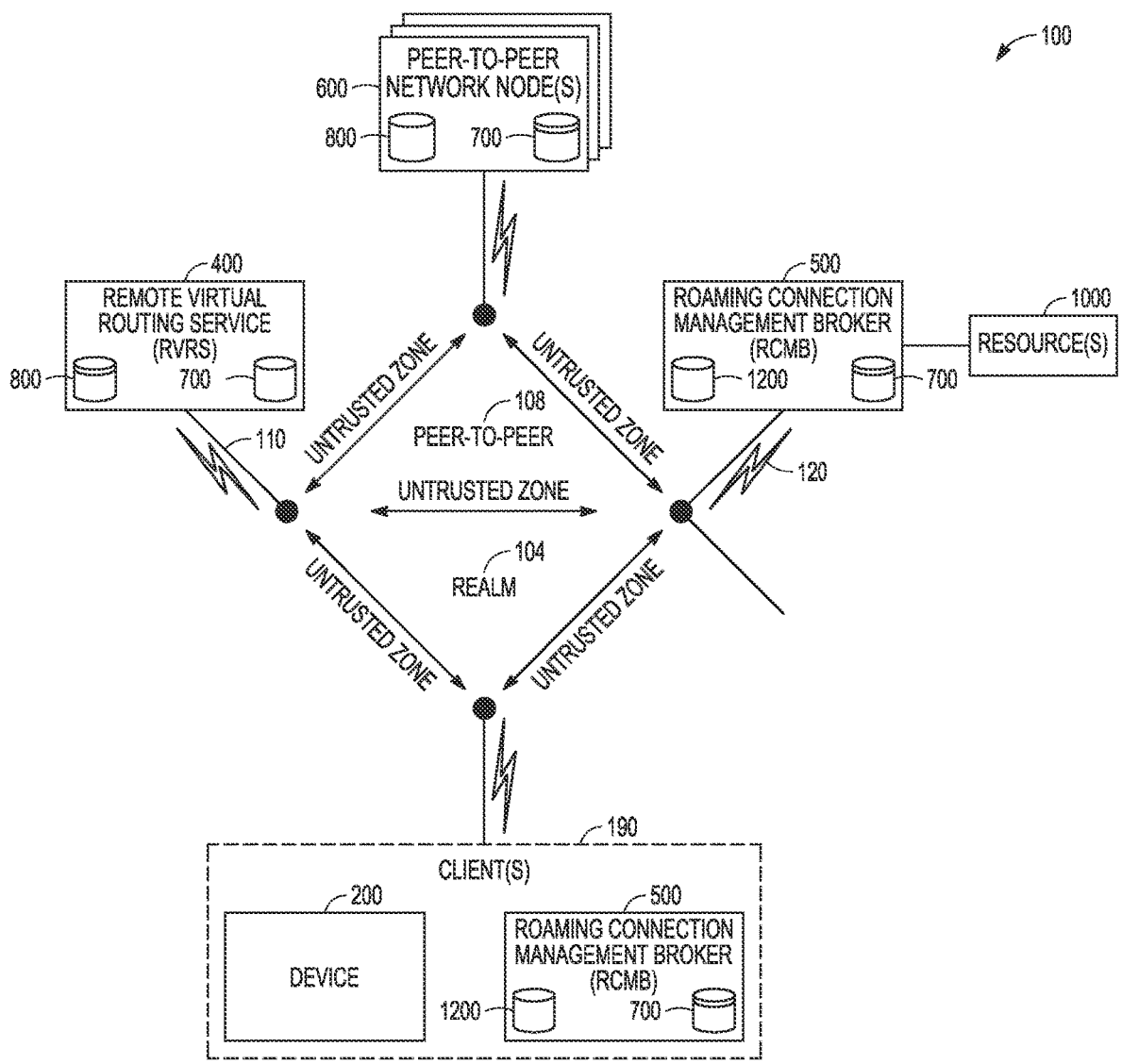
FIG. 4 is a block diagram of another embodiment illustrating a zero trust access system.
Figure 5:
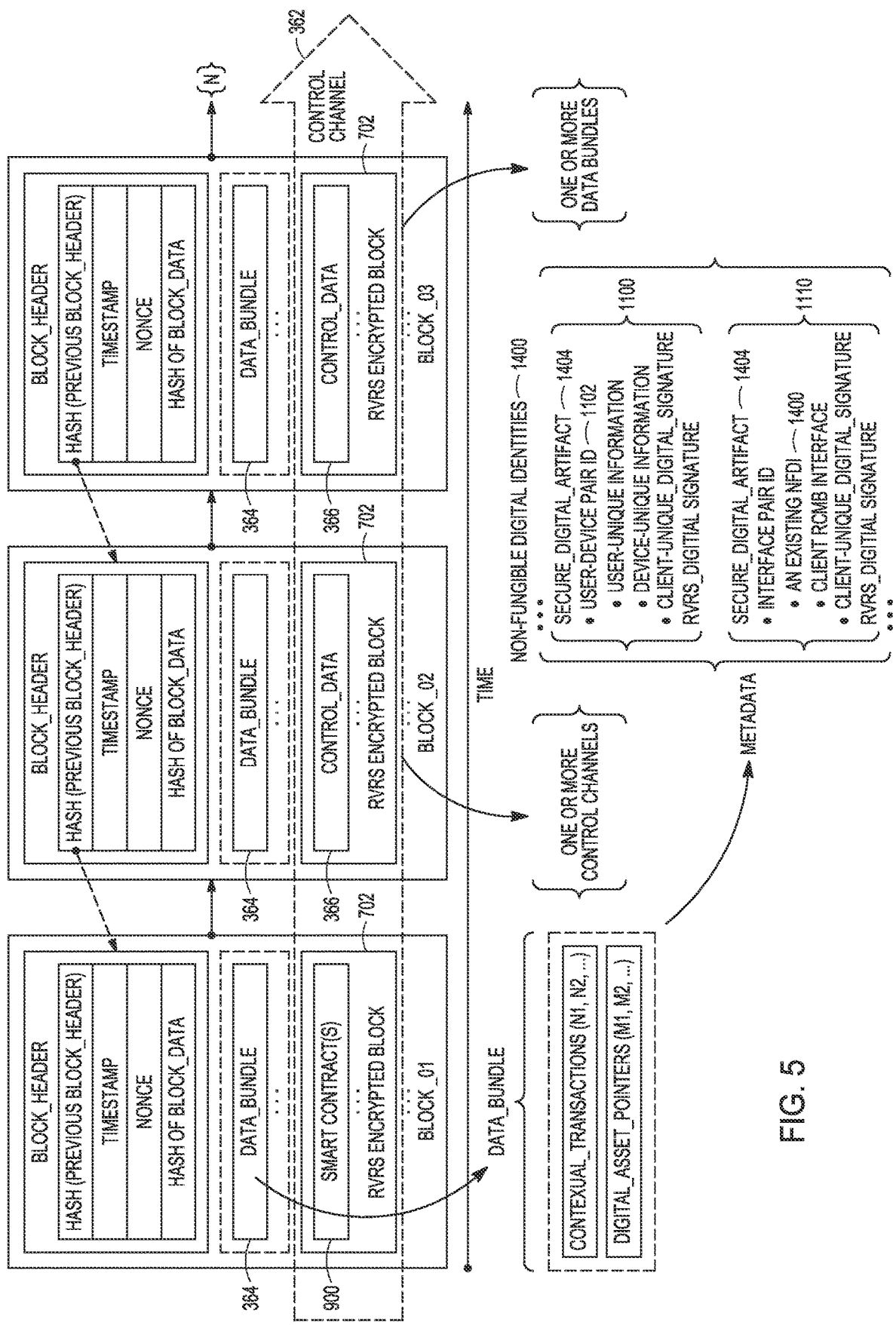
FIG. 5 illustrates a distributed ledger.
Figure 6:
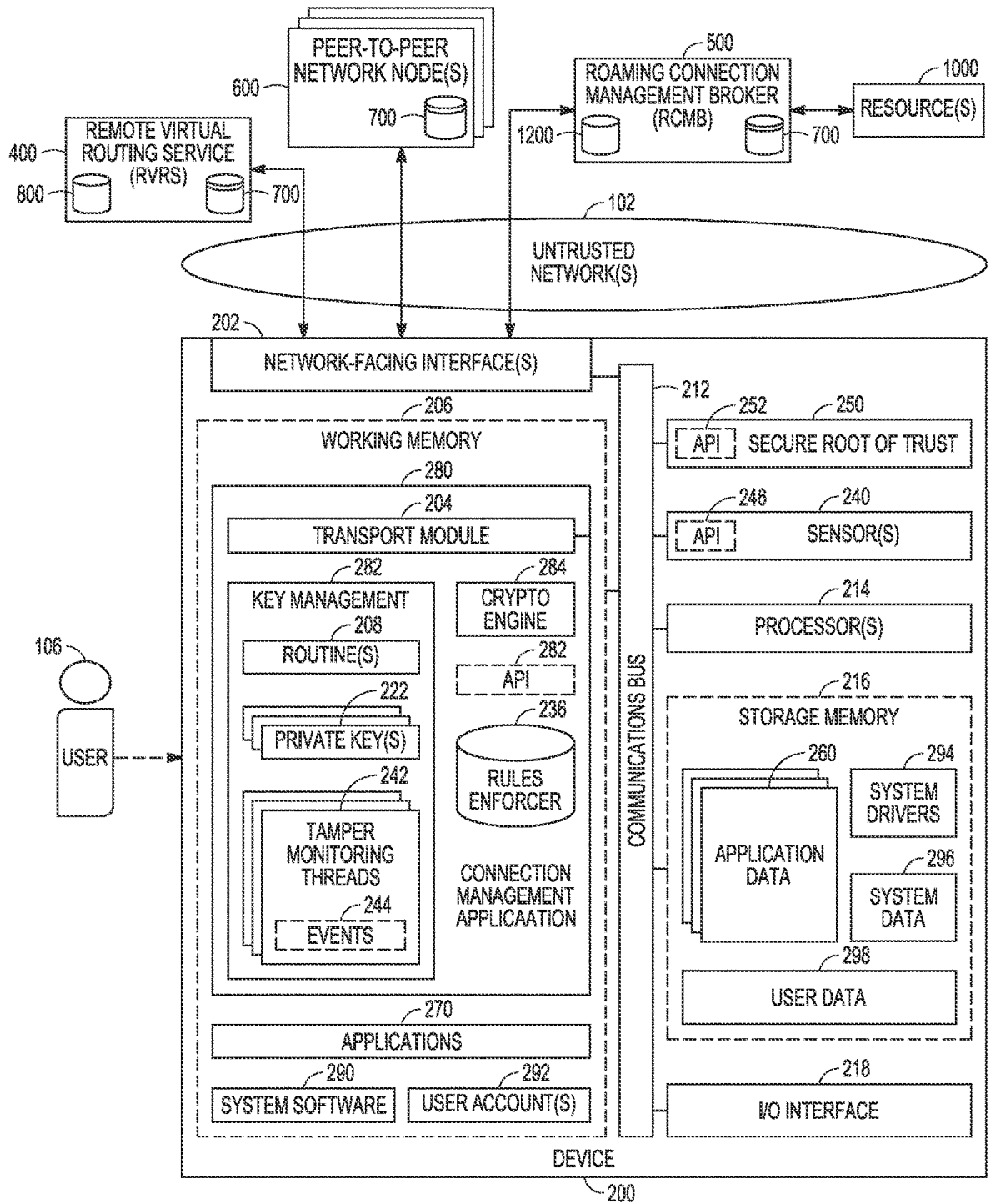
FIG. 6 illustrates a coupling of a user device to a system, and further illustrates details of the user device.
Figure 7:
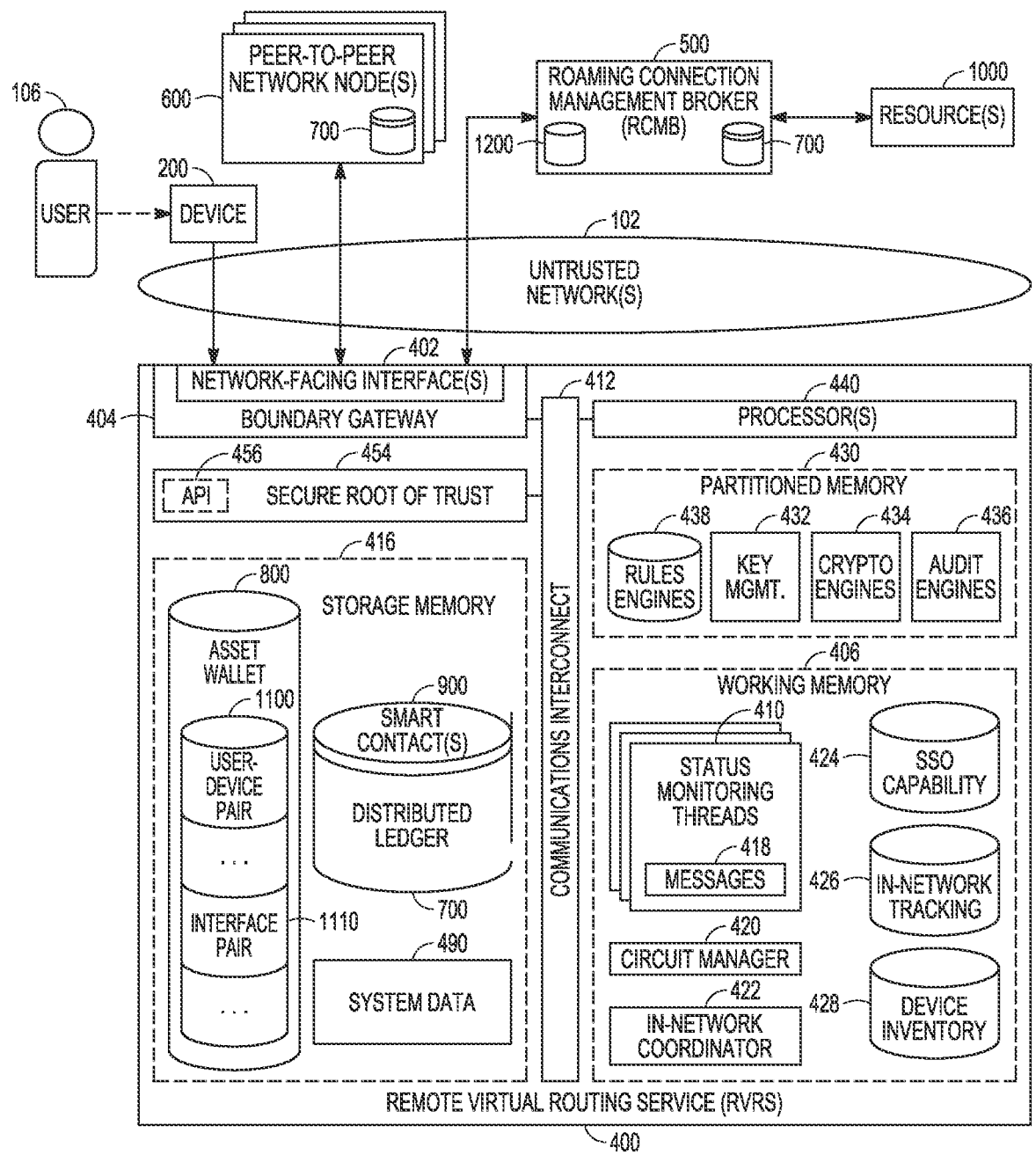
FIG. 7 illustrates a coupling of a Remote Virtual Routing Service (RVRS) to a system, and further illustrates details of the RVRS.
Figure 8:
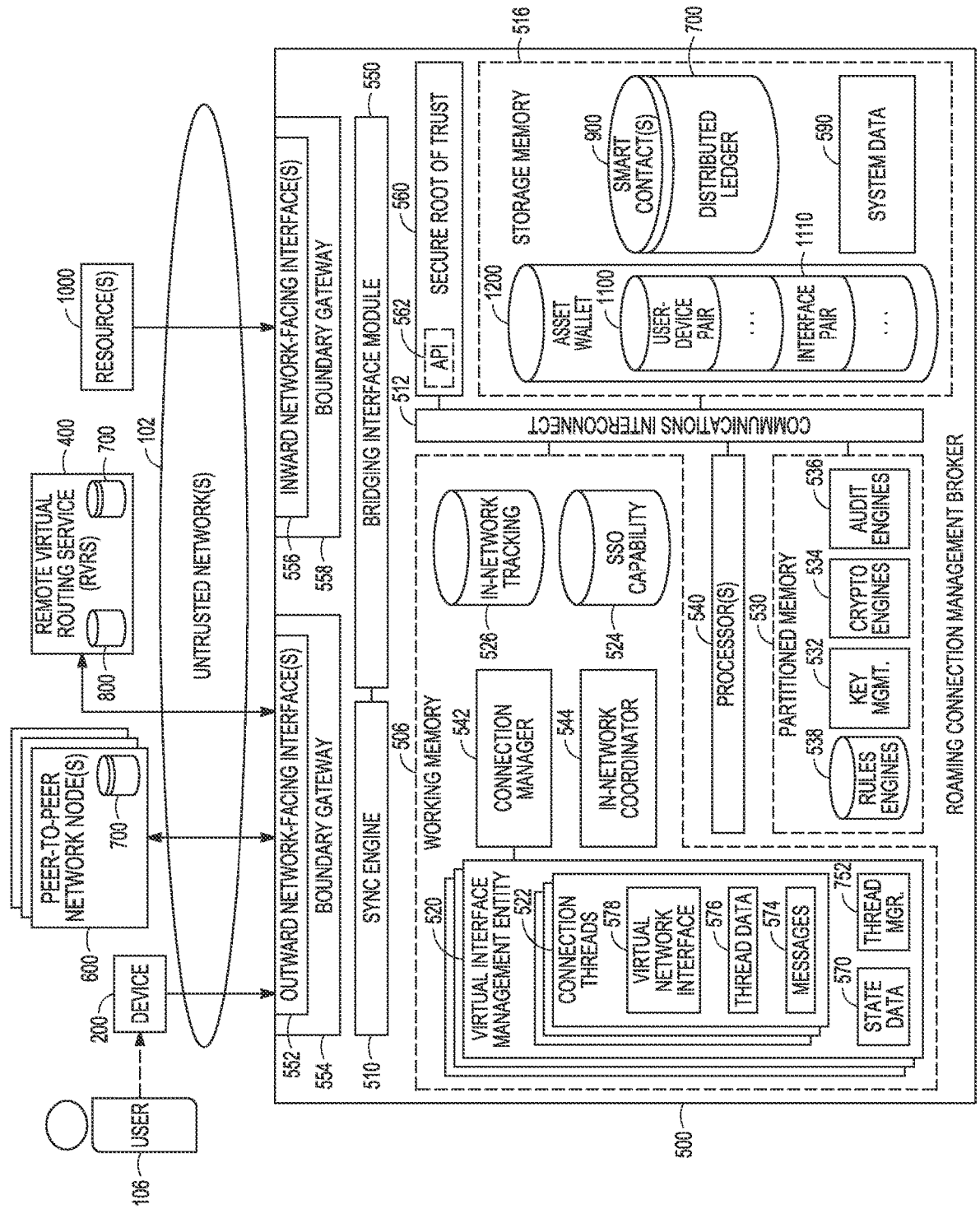
FIG. 8 illustrates a coupling of a Roaming Connection Management Broker (RCMB) to a system, and further illustrates details of the RCMB.
Figure 9:
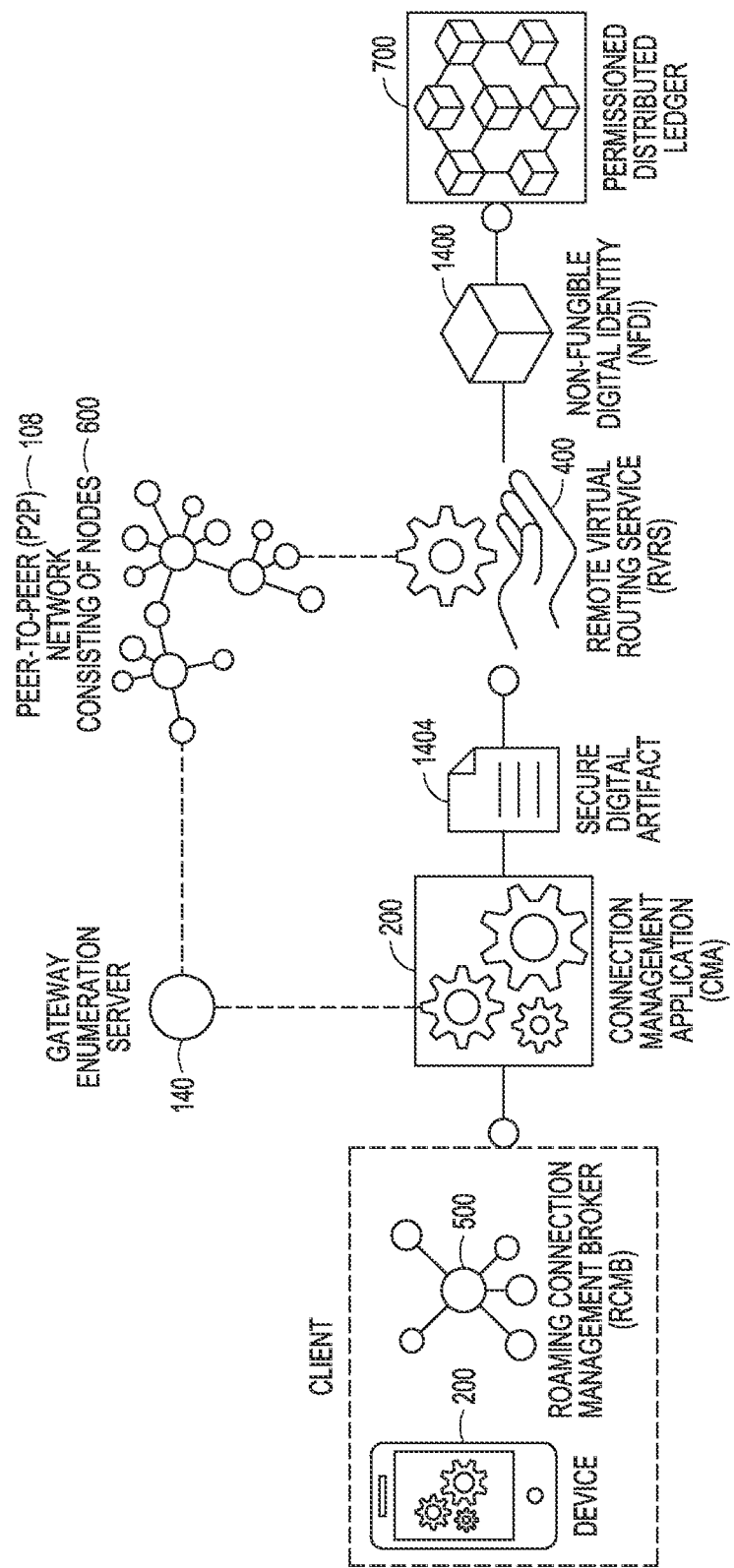
FIG. 9 illustrates the generation of contextual non-fungible digital entities.
Figure 10:
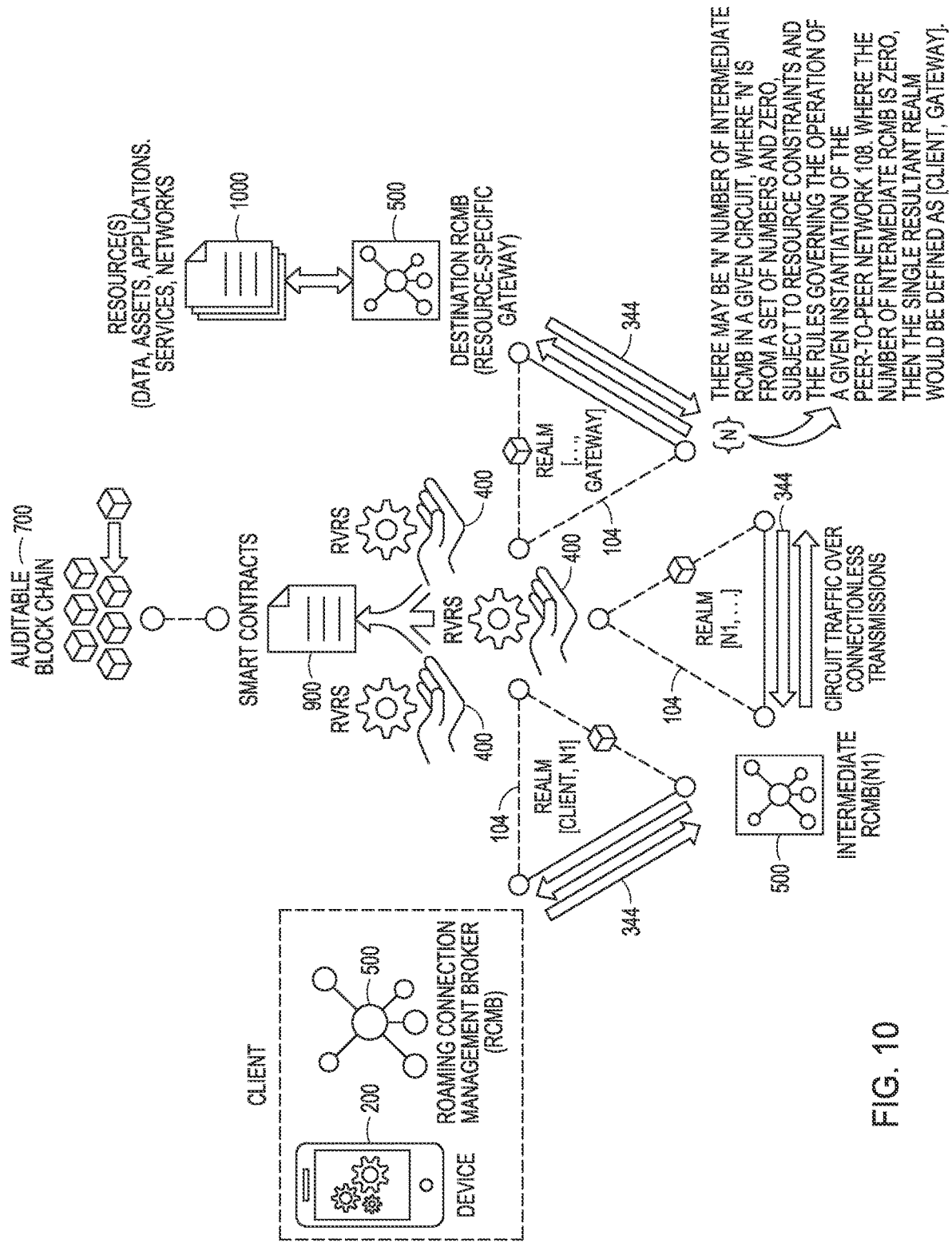
FIG. 10 illustrates circuit routing in a peer-to-peer blockchain network.
Figure 11:
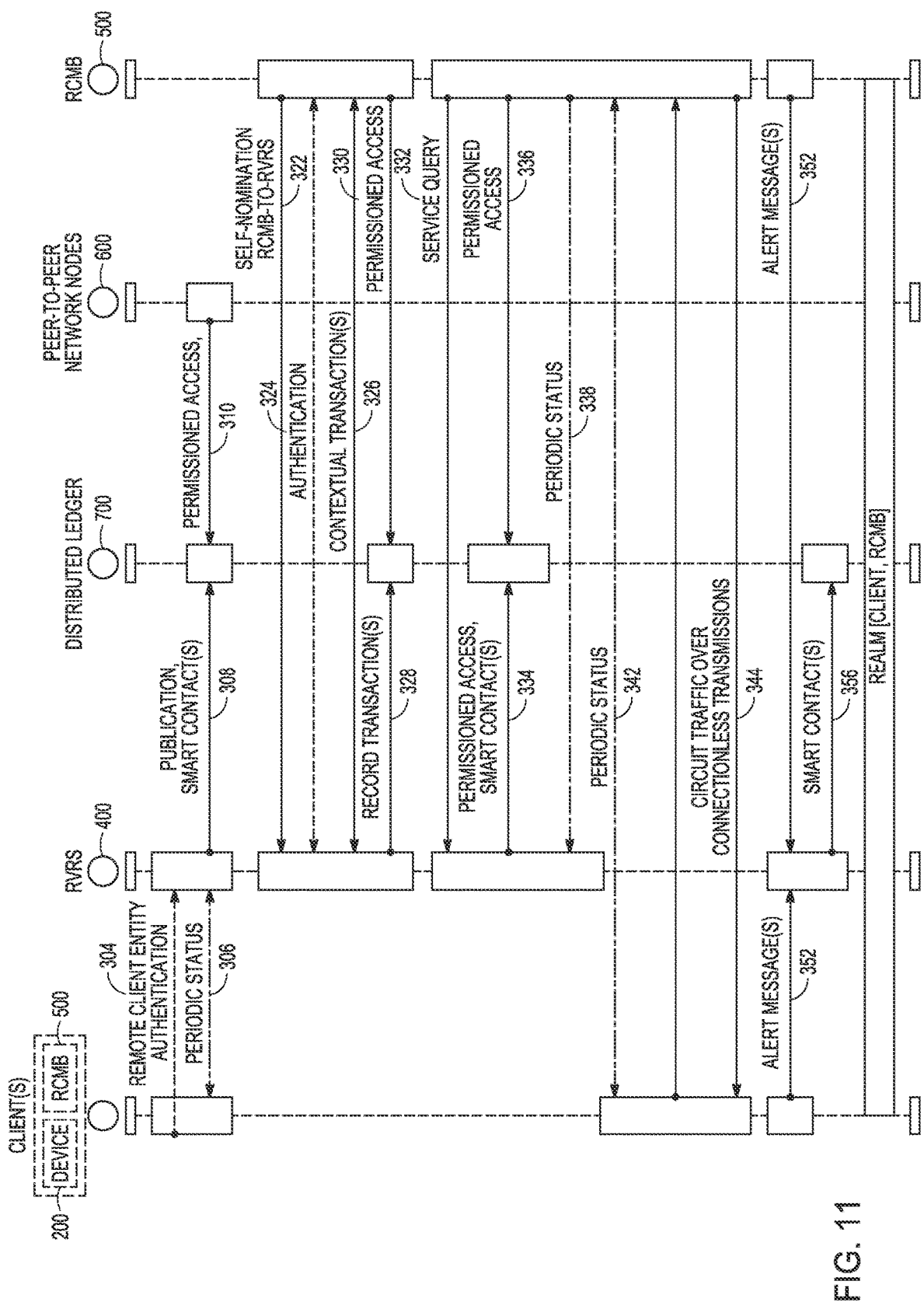
FIG. 11 illustrates a method to establish a realm and events that occur in the realm.

In an embodiment, zero trust system design principles eliminate or minimize the implicit trust entrusted to any single element, node, or service of a network. The zero trust access problem is illustrated in FIG. 1, which shows a remote device communicating with a policy decision point (PDP) and policy enforcement point (PEP) module. This communication is within an untrusted zone. The PDP/PEP module then permits access, if appropriate, to a resource, such as a network, a system, an application, and/or data.

Figure 12:
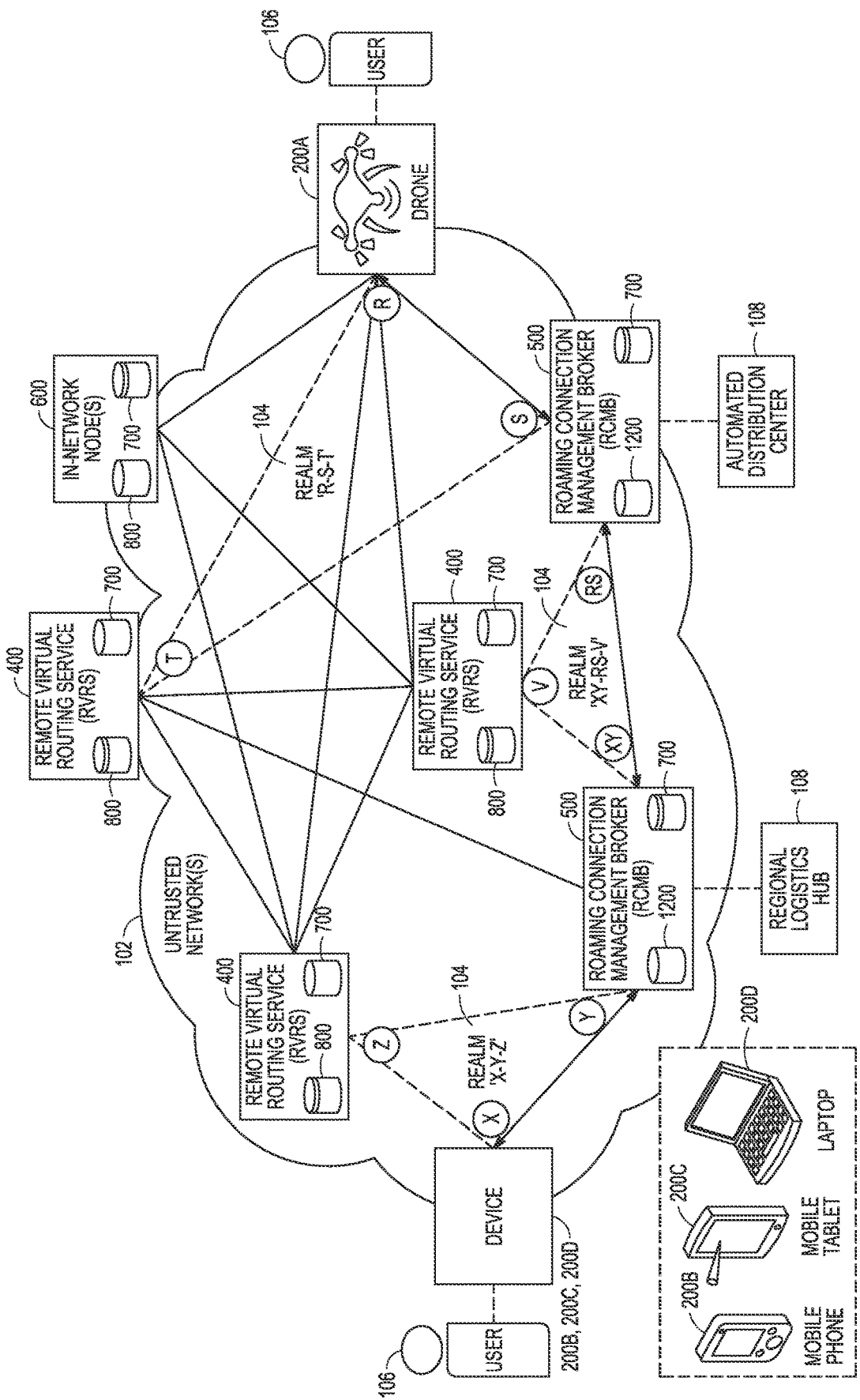
FIG. 12 illustrates an instantiation of a plurality of realms.
Figure 13:
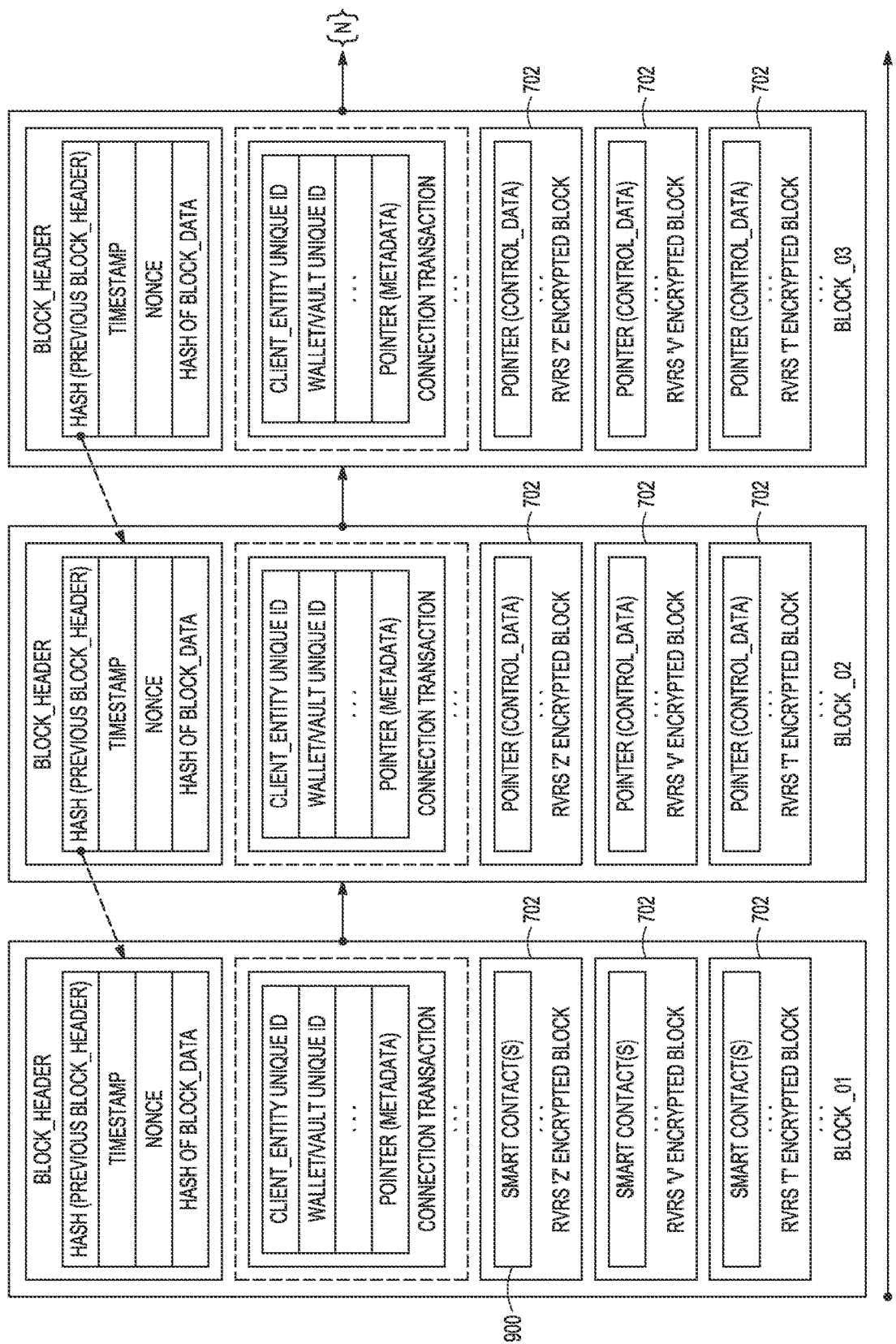
FIG. 13 illustrates another embodiment of a distributed ledger.
Figure 14:
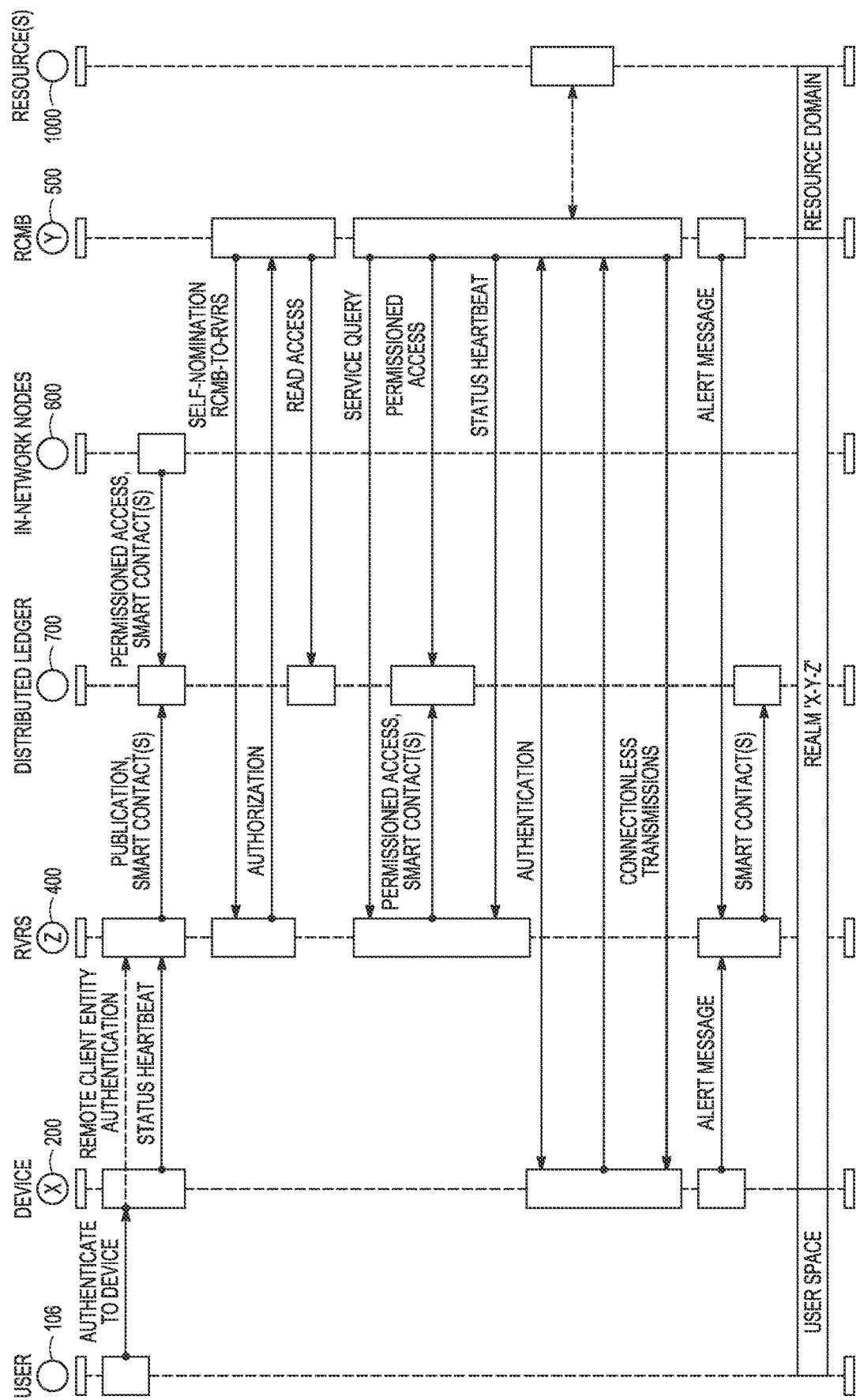
FIG. 14 illustrates a method to establish a realm and events that occur in the realm.
Figure 15:
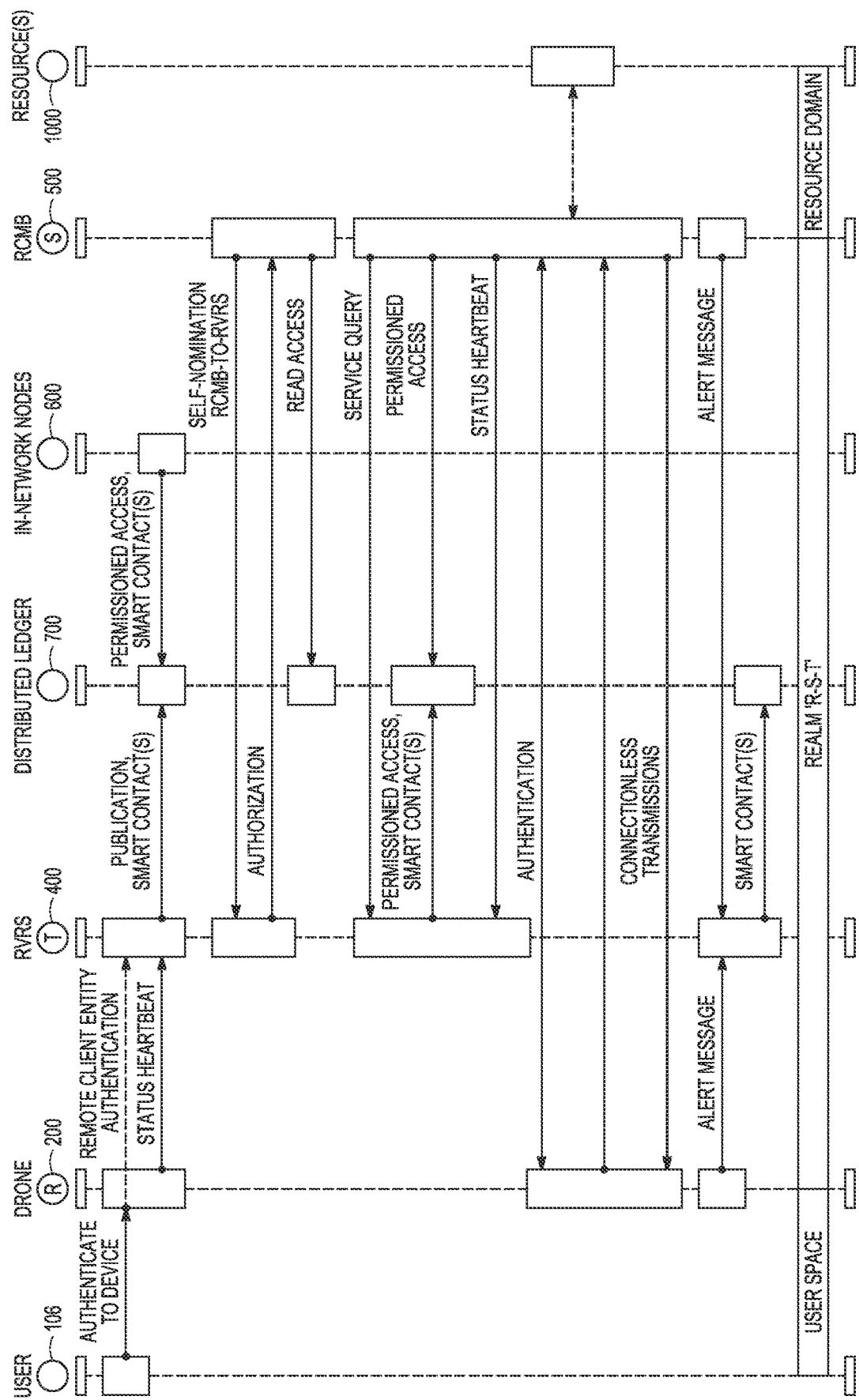
FIG. 15 illustrates a method to establish a realm and events that occur in the realm.
Figure 16:
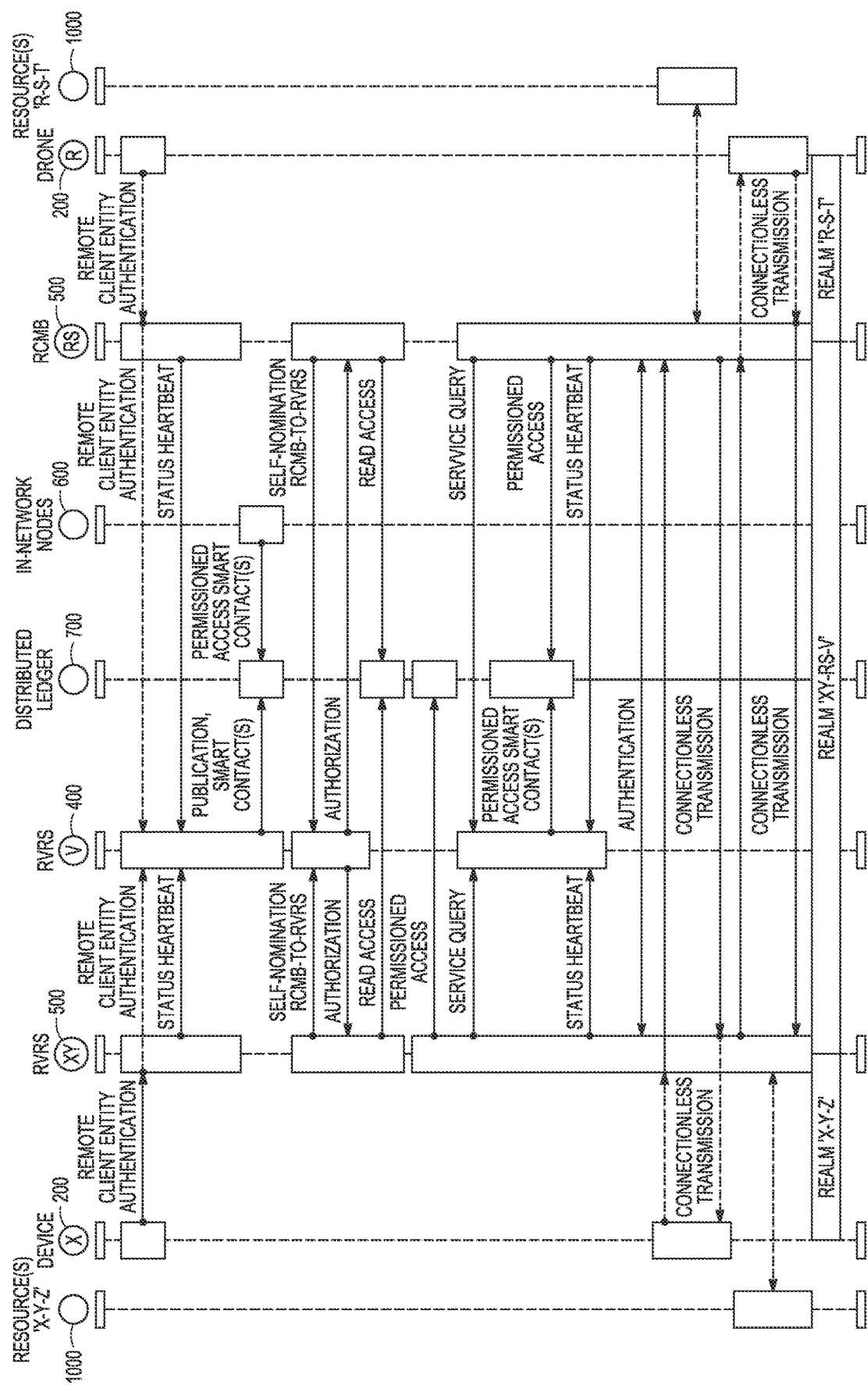
FIG. 16 illustrates a method to establish a realm and events that occur in the realm.
Figure 17:
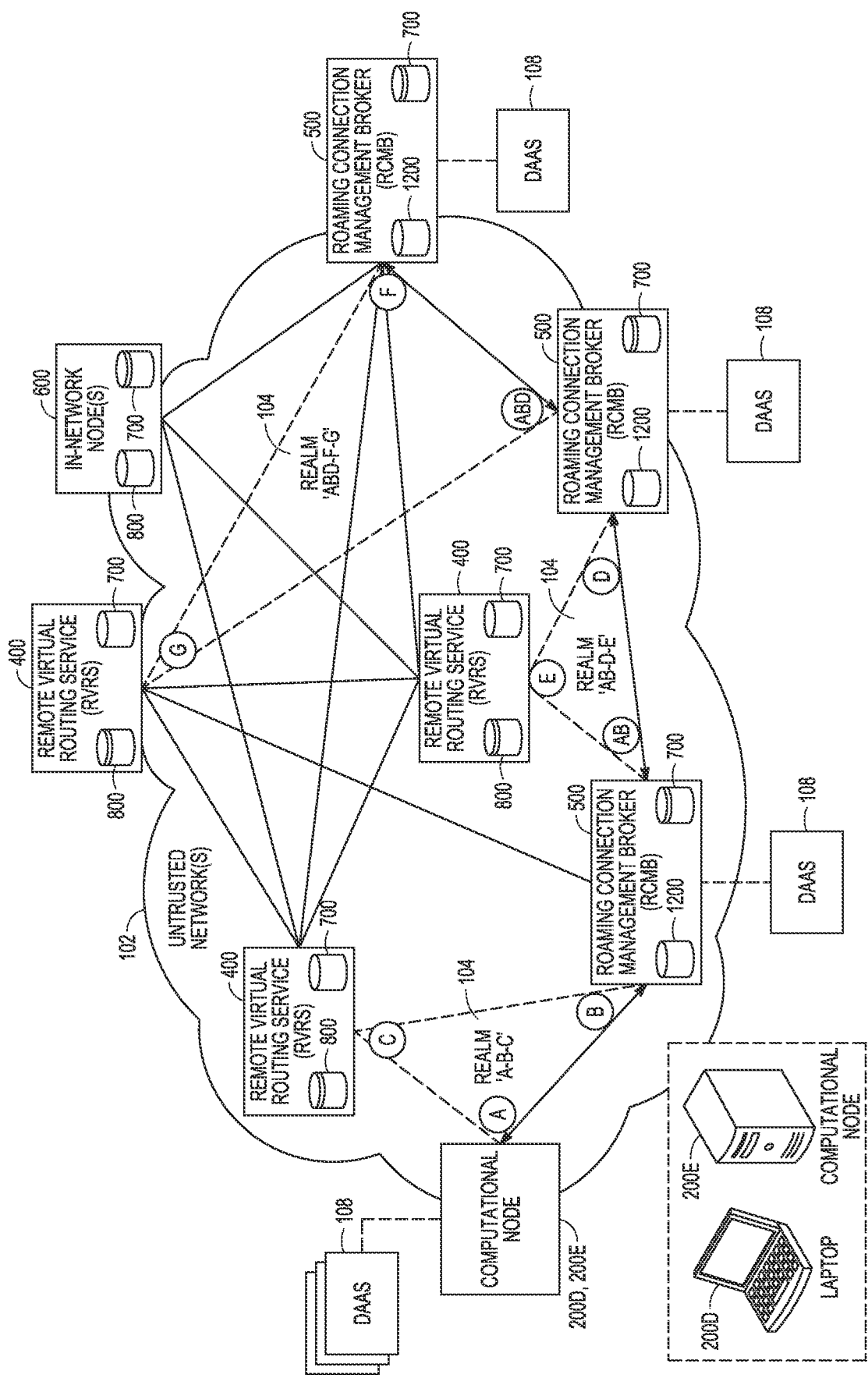
FIG. 17 illustrates a method to establish a plurality of realms.
Figure 18:
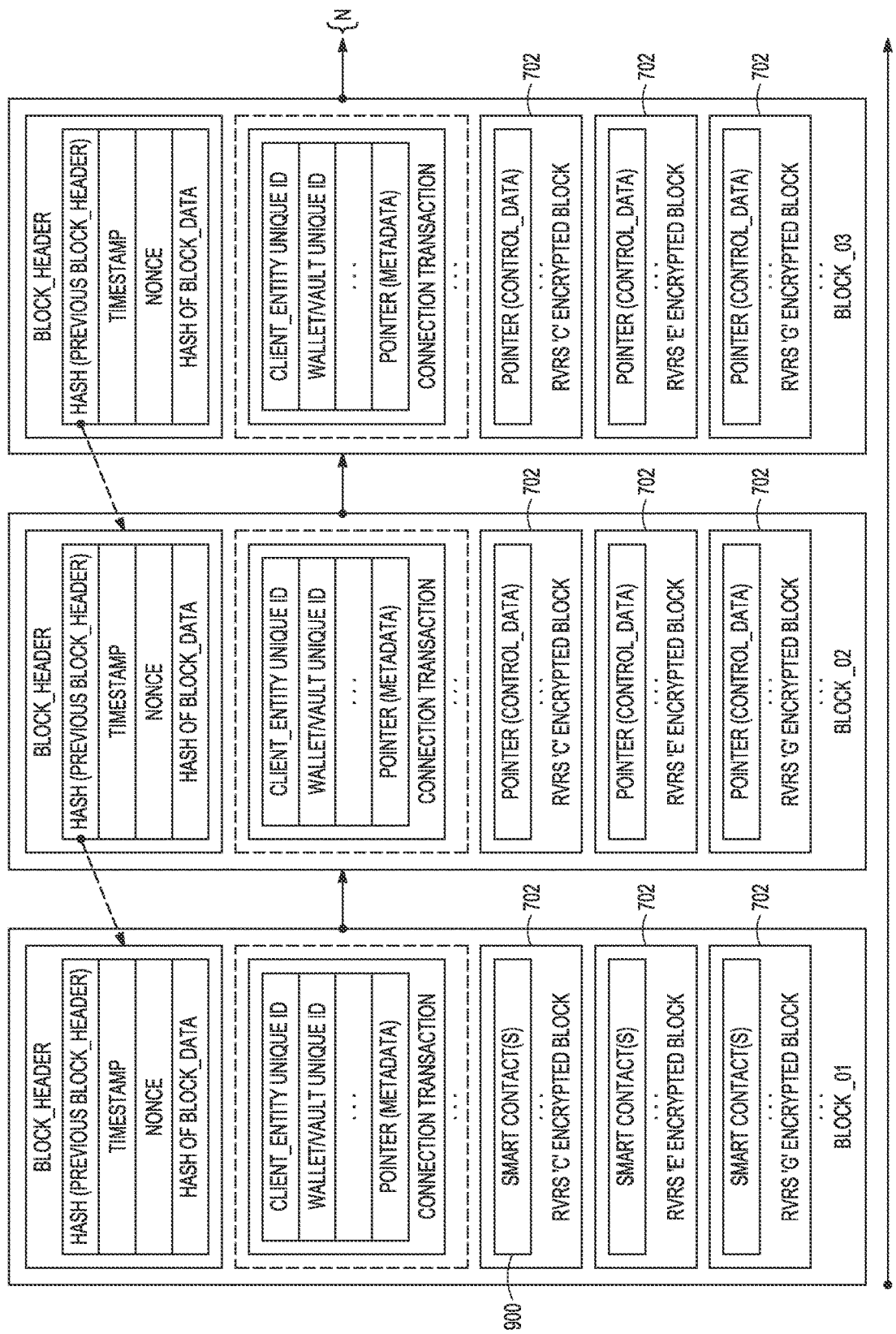
FIG. 18 illustrates another embodiment of a distributed ledger.
Figure 19:
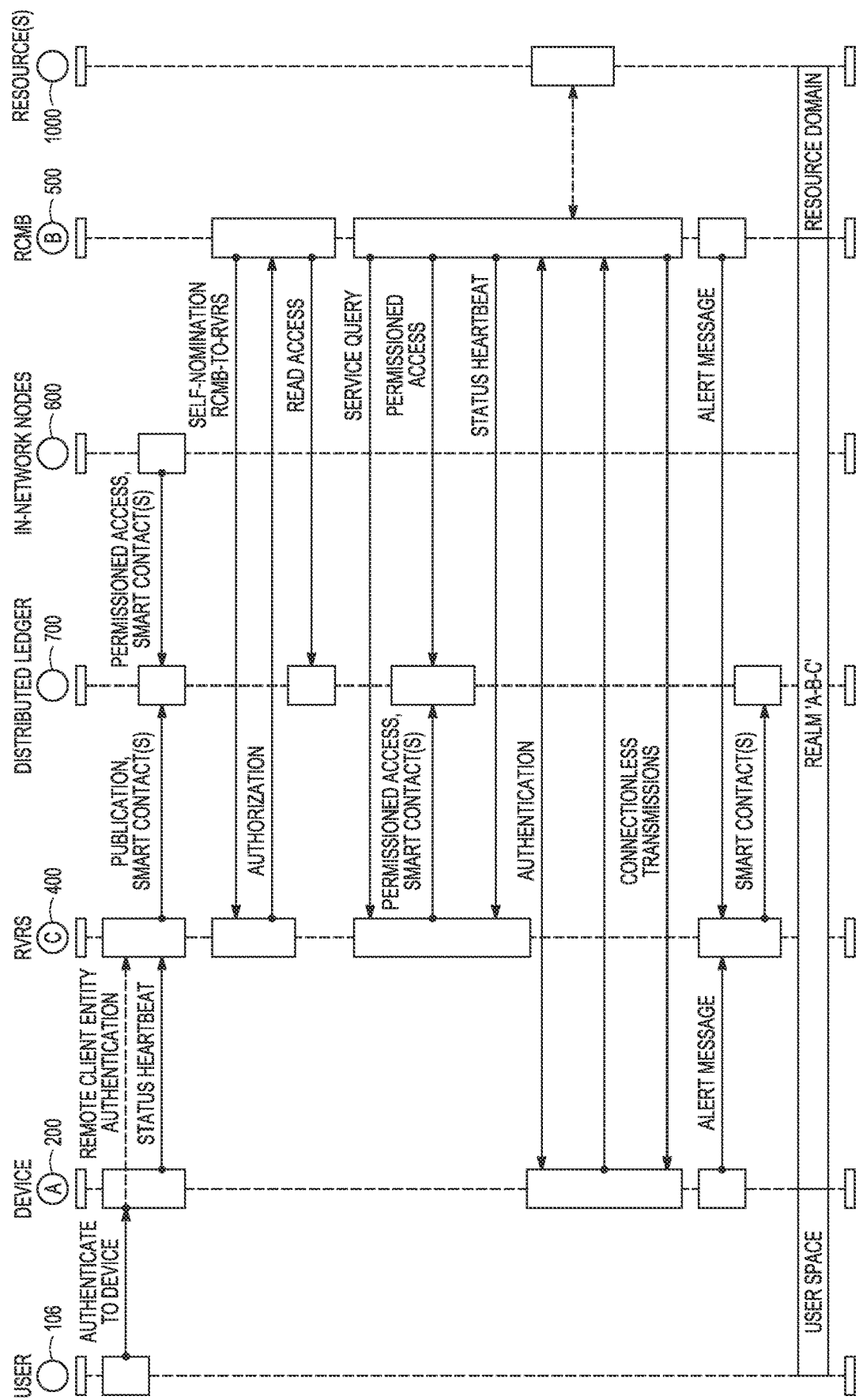
FIG. 19 illustrates a method to establish a realm and events that occur in the realm.
Figure 20:
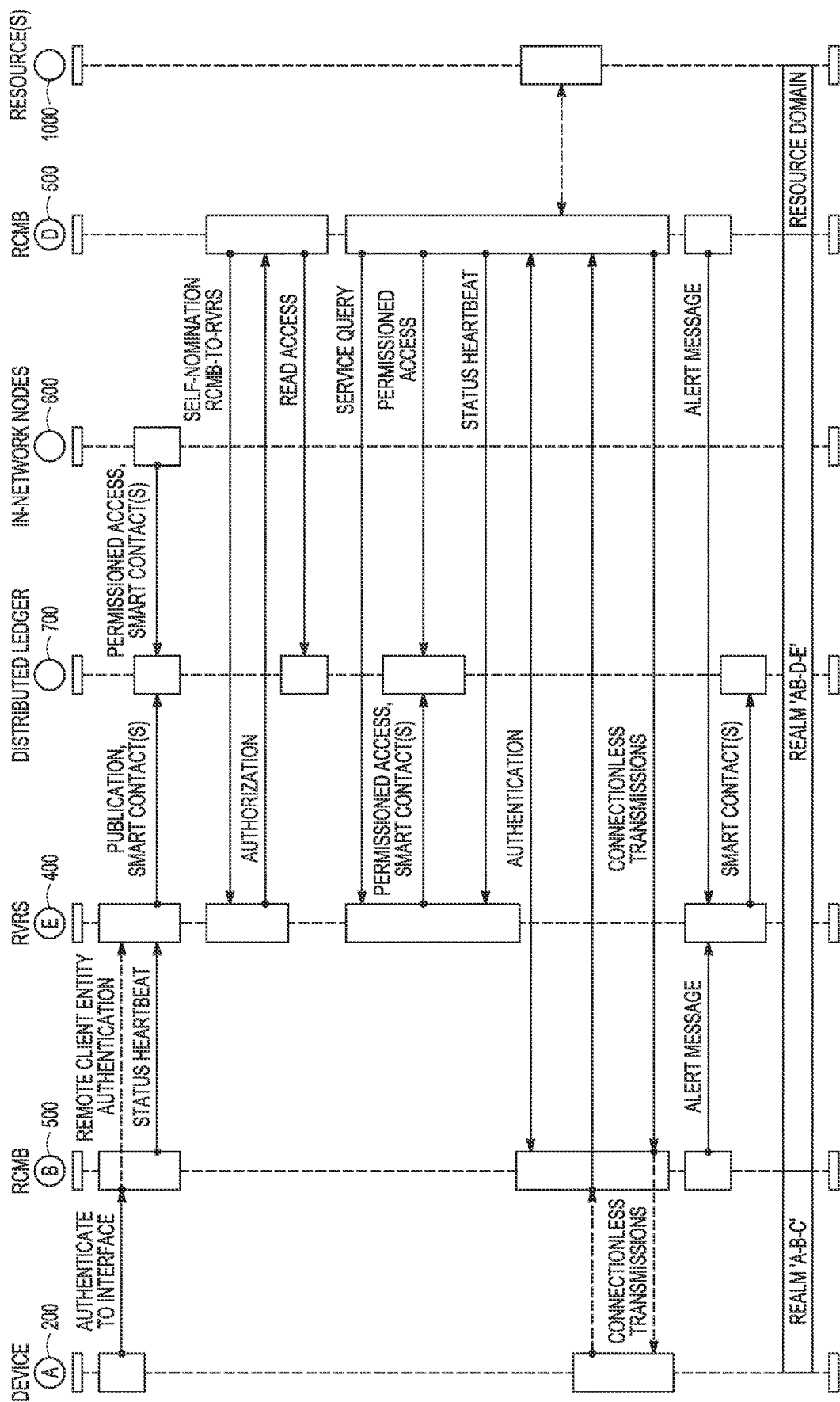
FIG. 20 illustrates a method to establish a realm and events that occur in the realm.
Figure 21:
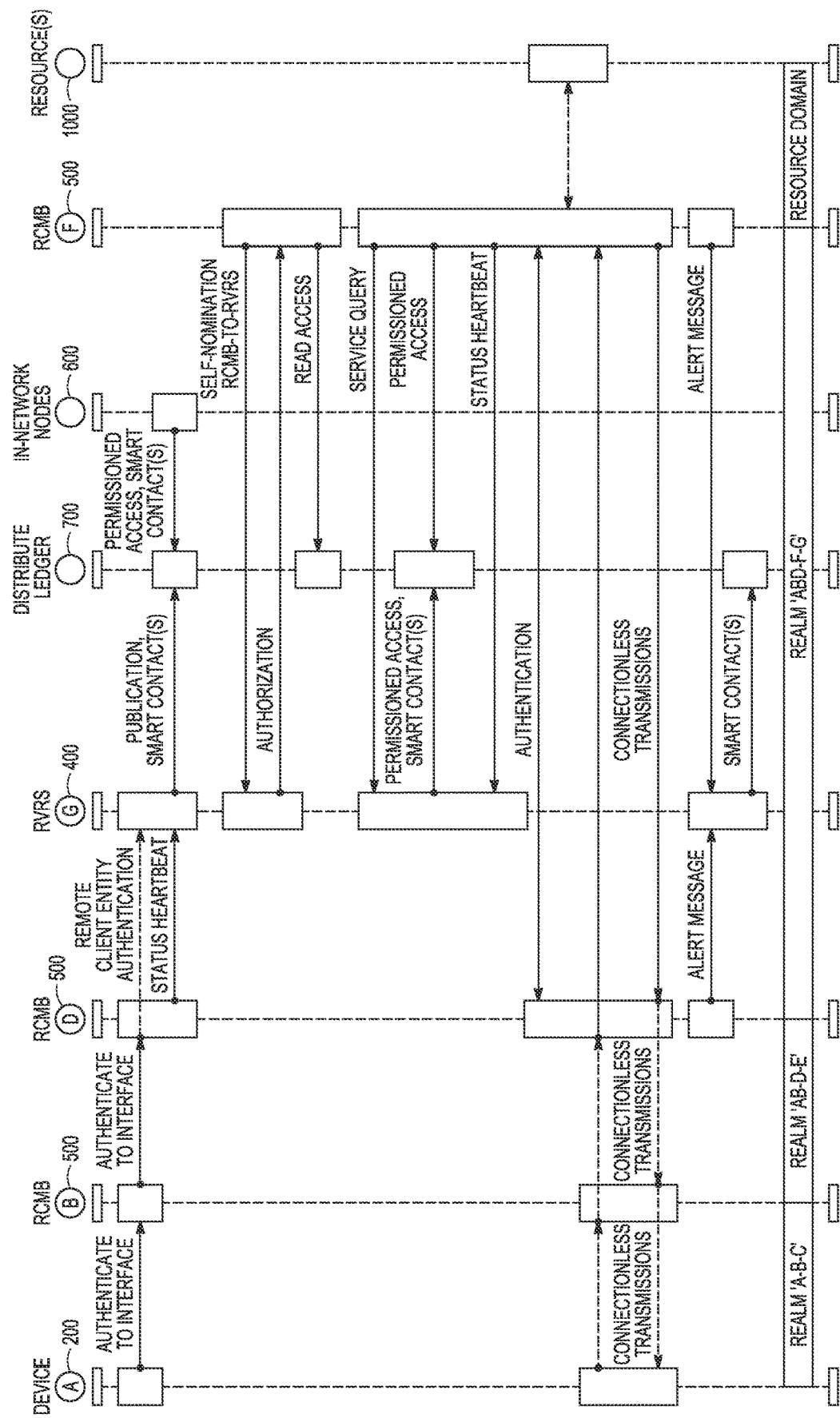
FIG. 21 illustrates a method to establish a realm and events that occur in the realm.

One or more embodiments are systems and methods for auditable tamper-resistant remote zero trust access. These systems and methods are generally illustrated in FIGS. 2, 3, 4, 5, 6, 7, 8, 9, 10, 11, 12, 13, 14, 15, 16, 17, 18, 19, 20, 21, 22, and 23, wherein each instantiation forms a distinct domain of interest Realm 104—FIG. 12) and multiple instantiations are chainable in succession enabling secure circuits for the routing of in-network traffic.

Referring to the above-noted figures, an embodiment is comprised of three core components that together form a ternary access control relationship—a client computational node (or remote device) 200 or a Roaming Connection Management Broker (RCMB) 500 serving in a client capacity, a distributed authentication service (Remote Virtual Routing Service (RVRS) 400 serving in a Policy Decision Point (PDP) role, and a resource-specific gateway RCMB 500) serving in a Policy Enforcement Point (PEP) role that provides access to one or more domain resources. This system embodies a novel implementation of network architecture that leverages blockchain, smart contracts, a permissioned distributed ledger, and connectionless protocols (i.e., WireGuard, State Synchronization Protocol (SSP), etc.) to establish access control over a given zero trust domain of interest (e.g., Realm 104), where the RVRS 400 has no visibility into resource-specific data under the purview of a given RCMB 500. In this novel system, domain isolation is enforced by default and exclusivity of clients across realm interfaces is retained.

An embodiment of a system is designed for scenarios where networking infrastructure is pervasive, with a large number of access nodes that may or may not have overlapping areas of coverage (e.g., 5G, SpaceX Starlink, Amazon Kuiper, OneWeb, etc.), such that client devices 200 (and associated user 106) and/or RCMB 500 are likely to roam across multiple access points during a given session and may also experience coverage gaps. The devices can include a drone (200a), a smart phone (200b), a mobile tablet (200c), a laptop (200d), and/or a computational node (200e). Devices 200 and RCMB 500 provide status to the RVRS 400, which includes current address information. The RVRS 400 will convey status to applicable resource-specific gateways (RCMB 500), to include status concerning any client devices 200 and/or client RCMBs 500. The resource-specific gateway (RCMB 500) dynamically updates associated client devices 200 and/or client RCMBs 500 as a function of normal transmissions via a data field. In another embodiment, a first RCMB 500 controls access to a first set of resources and a second RCMB 500 controls access to a second set of resources.

The following details a process of adding an out-of-network node to a peer-to-peer network, supporting a distributed access control, client authentication, and routing service for in-network circuit routing of data packets based on contextual transactions recorded in a distributed blockchain ledger.

As part of the initialization of an out-of-network Peer-to-Peer Network Node 600, the system will check network connectivity status. If a network is reachable via wired 110 or wireless 120 transmissions, which may include connectivity to the internet and/or other untrusted networks 102, the out-of-network Peer-to-Peer Network Node 600 will attempt to establish a connection to the Peer-to-Peer Network 108. In certain embodiments, a Gateway Enumeration Server 140 is queried that will, upon successful credentials authentication of the out-of-network Peer-to-Peer Network Node 600, provide one or more valid connection profiles for the Peer-to-Peer Network 108.

To gain membership in the Peer-to-Peer Network 108, an out-of-network Peer-to-Peer Network Node 600 will send an initial query to the Peer-to-Peer Network 108. The Remote Virtual Routing Service (RVRS) 400 for the Peer-to-Peer Network 108 will then acknowledge the query and execute a communication handshake to establish a secure connection. Upon establishment of a secure connection, the out-of-network Peer-to-Peer Network Node 600 must authenticate to the security domain of the Peer-to-Peer Network 108. Failures result in terminating the session and auditable logging of the event. In certain embodiments, the RVRS 400 will further interrogate authenticity by querying the Secure Root of Trust 454 and API 456 of the out-of-network Peer-to-Peer Network Node 600. Failure of remote attestation results in connection termination and, in certain embodiments, logged events against the out-of-network Peer-to-Peer Network Node 600.

Upon successful authentication and/or interrogation of the out-of-network Peer-to-Peer Network Node 600, the RVRS 400 will match credentials for the out-of-network Peer-to-Peer Network Node 600 against the In-Network Tracking Database 626 inventory for the security domain. Success results in the out-of-network Peer-to-Peer Network Node 600 being registered as an in-network Peer-to-Peer Network Node 600 and may participate in Consensus Activities 334 relevant to the execution of the permissioned Distributed Ledger 700. If configured to do so, an in-network Peer-to-Peer Network Node 600 may function as part of the distributed RVRS 400 for that Peer-to-Peer Network 108.

The following details the process of adding an out-of-network node to the peer-to-peer network as a connection management broker, and supporting in-network circuit routing of data packets based on contextual transactions recorded in a distributed blockchain ledger.

As part of Roaming Connection Management Broker (RCMB) 500 initialization, it will check network connectivity status. If a network is reachable via Wired 110 or Wireless 120 transmissions, which may include connectivity to the internet and/or other Untrusted Networks 102, the RCMB 500 will attempt to establish a connection to one of a known list of RVRS 400. In certain embodiments, a Gateway Enumeration Server 140 is first queried that will, upon successful credentials authentication of RCMB 500, provide a listing of valid RVRS 400 connection profiles.

To participate in-network as a registered RCMB 500 capable of soliciting clients, the RCMB 500 will send an initial query to an RVRS 400. The RVRS 400 will then acknowledge the query and execute a communication handshake to establish a secure connection. Upon successful connection, the RCMB 500 must authenticate to the security domain of the RVRS 400. Failures result in terminating the session and auditable logging of the event. In certain embodiments, RVRS 400 will further interrogate authenticity of RCMB 500 by querying its Secure Root of Trust 560 and API 562.

Upon successful authentication and/or interrogation of the RCMB 500, the RVRS 400 will match RCMB 500 credentials against the In-Network Tracking Database 426 inventory for the security domain. Failure results in termination of connection and, in certain embodiments, logged events against the RCMB 500.

Success means the RCMB 500 has registered as an in-network Peer-to-Peer Network Node 600 in the network and may participate in Consensus Activities 336 relevant to the execution of the Distributed Ledger 700. The RVRS 400 will ascertain if any eligible Non-Fungible Digital Identities (NFDI) 1400 (i.e., User-Device Pair 1100, Interface Pair(s) 1110) are pending in the Asset Vault 800, where eligibility to establish a connection between a client and an RCMB is a function of both the assigned constituent permissions of a given NFDI 1400, and an RCMB Solicitation Profile 1406. Solicitation Profiles 1406 are provided to the RVRS 400 as part of a given RCMB's self-nomination 322—e.g., request for in-network participation. Non-client RCMBs may be configured to submit service queries 332 that are then utilized by the RVRS as a contributing decision factor when determining routing decisions.

Where eligibility exists, RVRS 400 will execute Smart Contract(s) 900 from the Distributed Ledger 700 to execute Contextual Transactions 326 for applicable NFDI 1400, between the RVRS Asset Vault 800 to soliciting RCMB Asset Wallet(s) 1200. Transactions are Bundled 364 by the PATS 400 and recorded to the auditable blockchain of the Distributed Ledger 700. One or more Control Channels 362 exist within the Distributed Ledger 700, maintained in encrypted Data Blocks 702 to provide for data partitioning of privileged Smart Contracts 900 and Control Data 366 within the Distributed Ledger 700.

Upon status validation of an active Connection 1300 within the Distributed Ledger 700, the RVRS 400 will verify access permissions are appropriate. If so, then RVRS 400 will update status on any active connection by issuing status messages concerning the NFDI 1400 to the applicable—e.g., owning—ROM 500. Else, RVRS 400 will alarm the Connection 1300.

The following details a process for adding new mobile clients, supporting the access control and authentication of clients, creating non-fungible digital identities (NFDI), establishing new routing circuits, querying the ledger, and publishing status to existing routing circuits.

If Device 200 is in an inactive state, User 106 initializes Device 200. Device 200 initiates trust evaluation with Secure Root of Trust 250 using API 252, to assess Sensor(s) 240 using Sensor API 246 to determine if Sensor(s) 240 have generated tamper Event(s) 244, in which case Routine(s) 208 will trigger to sanitize Private Key(s) 222 and in certain embodiments the entire Device 200. The Device will periodically check for the existence of Event(s) 244.

If trust evaluation is successful, User 106 authenticates to Device 200 using System Software 290. In certain embodiments, a set number of failed attempts will trigger tamper Event(s) 244. In certain embodiments, multi-factor authentication will be required and failure to successfully execute such additional authentication steps may also trigger tamper Event(s) 244.

User 106 opens Connection Management Application 280 on Device 200. In certain embodiments, successful initialization of the Connection Management Application 280 requires an additional application-specific single or multi-factor authentication where a number of failed attempts or the failure to produce a required physical token may trigger a tamper Event 244.

Connection Management Application 280 checks for existing Digitally Identifiable Identity Digest (DIID) 1402 for User 106. If no DIID 1402 exists, an initial first application-generated DIID 1402 is created incorporating a combination of user-unique identifiable feature(s) and hardware-unique identifiable feature(s), and digitally signed using private key of the User 106 to create a Secure Digital Artifact 1404. In certain embodiments, if no public/private key pairs associated to User 106 exist in Private Key(s) 222, the Connection Management Application 280 notifies User 106 to execute API 282 and key generation/publishing Routine(s) 208. In certain embodiments, functionality may be initiated by User 106 upon command. In certain embodiments, Secure Digital Artifacts 1404 may only be generated while the Device 200 is physically connected to a purpose built development asset or at time of manufacture.

As part of Connection Management Application 280 initialization on the Device 200, it will check Device 200 network connectivity status. If a network is reachable via Wired 110 and/or Wireless 120 transmissions, which may include connectivity to the internet and/or other Untrusted Networks 102. Connection Management Application 280 will attempt to establish a connection to one of a known list of RVRS 400. In certain embodiments, a Gateway Enumeration Server 140 is first queried, which upon successful user authentication will provide a listing of valid RVRS 400 connection profiles.

To establish such a connection, the Connection Management Application 280 will send an initial query to an RVRS 400. The RVRS 400 will then acknowledge the query and execute a communication handshake to establish a secure connection. Upon successful connection, the User 106 must Authenticate 304 to the security domain of the PATS 400. In certain embodiments, this will require one or more authentication criteria (such as valid PKI credentials, webmail login information, SSO-compatible credentials, multi-factor authentication, physical token generator, etc.). Failure to authenticate results in termination of the connection attempt. In certain embodiments, this results in RVRS 400 logging the attempt.

Upon successful User 106 authentication to the RVRS 400, the RVRS 400 will interrogate the authenticity of the Device 200 by querying the Secure Root of Trust 250 and API 252. Failures result in logged events for User 106 and Device 200, and terminating the session.

Upon successful interrogation of Device 200, the Secure Digital Artifact 1404 is transmitted to the RVRS 400. The public key of User 106 is used to validate the Secure Digital Artifact 1404. The RVRS 400 will match Device 200 credentials against the Device Inventory 428 for the security domain. Failure results in termination of connection and logged events for User 106 and Device 200.

Upon successful device matching, the RVRS 400 will determine if User 106 and Device 200 forms an existing unique Non-Fungible Digital Identity (NFDI) 1400.

Where no pairing exists, the RVRS 400 will issue a unique Non-Fungible Digital Identity (NFDI) 1400 (i.e., User-Device Pair 1100, Interface Pair 1110) incorporating the Secure Digital Artifact 1404 that conforms to an established profile scheme, and digitally signed by the coining RVRS 400. Smart Contract(s) 900 automatically execute (308, 326, 356) upon coining by an RVRS 400 to Publish 308 the NFDI 1400 to the auditable blockchain of Distributed Ledger 700, assigning the newly coined NFDI 1400 to its Asset Vault 800.

Should a given pairing exist, RVRS 400 will execute Smart Contract(s) 900 on associated NFDI 1400 to initiate a query (308, 334, 356) for the current status of an NFDI 1400 from the Distributed Ledger 700.

Upon current status validation of an active Connection 1300 in the Distributed Ledger 700, the RVRS 400 will verify access permissions are appropriate. If so, then RVRS 400 will update status on any active Connection 1300 by issuing status Messages 352 concerning the NFDI 1400 to the applicable—e.g., owning—RCMB 500. Else, RVRS 400 will Alarm 356 the Connection 1300.

Periodic status messaging, to include current address information, is provided between the RVRS and clients of all types (306), between the RVRS and non-client RCMBs of all types (338), and from a non-client RCMB unidirectionally to valid clients (342). Whereby clients will only provide status updates directly to the RVRS and a non-client RCMB will only receive client status directly from the RVRS.

The following details a process for the establishment, execution, and management of In-Network Routing Circuits.

For or a client (i.e., Device 200, RCMB 500) seeking access to a Resource 1000, the RVRS 400 will execute contextual transactions with non-client RCMB 500 with respect to a given NFDI 1400 in accordance with access control, permissions caveats, and routing policies that are enforced for any applicable security domain(s).

Persistent logical routing circuits are established by the RVRS 400 to enable communication between a given client and an applicable non-client RCMB 500 functioning as a resource-specific gateway where access control policies are to be enforced, and additional non-client RCMB may serve as intermediate nodes for the purpose of the controlled routing of data packets using connectionless protocols 344. To participate as an intermediate node in such a circuit, a non-client RCMB must be authenticated as a Peer-to-Peer Network Node 600. To assure data confidentiality in-transit over such logical routing circuits, encryption and/or encapsulation of data packets may be used over connectionless transmissions 344, to include between individual hops and over the full or segmented portions of a given routing circuit.

Clients (200, 500), the RVRS 400, and any other participating Peer-to-Peer Network Node 600 may publish alert messages and/or alarms 352 in accordance with the policy in effect for a given Peer-to-Peer Network 108. Smart contracts 900 may be triggered 356 upon receipt or broadcast of such a message by the RVRS.

Dynamic composition of persistent logical routing circuits may change (i.e., rerouting of connections) in accordance with automated policy decisions and/or direction received from an out-of-network auditing and event management service 180 and/or an orchestration service 190.

Figure 22:
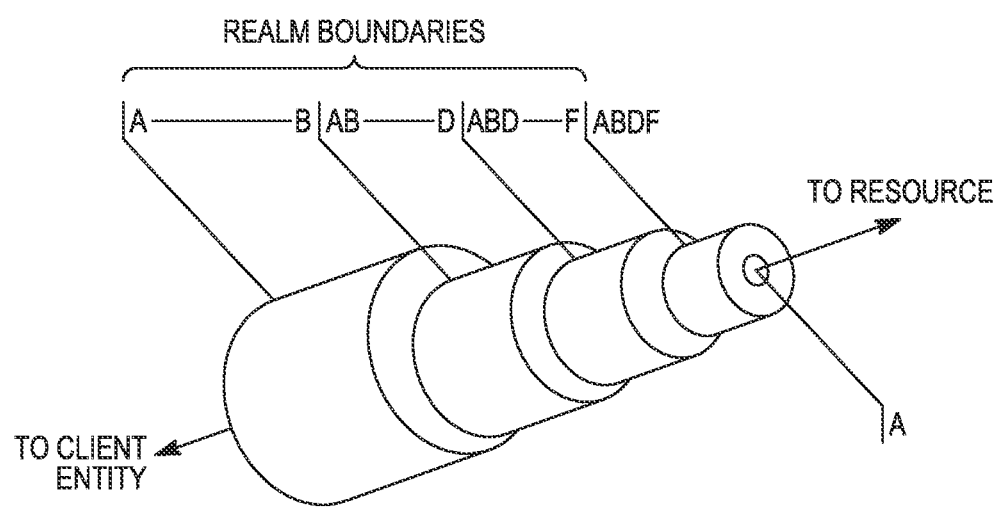
FIG. 22 illustrates a method to encapsulate data in an instantiation of a multi-realm.
Figure 23:
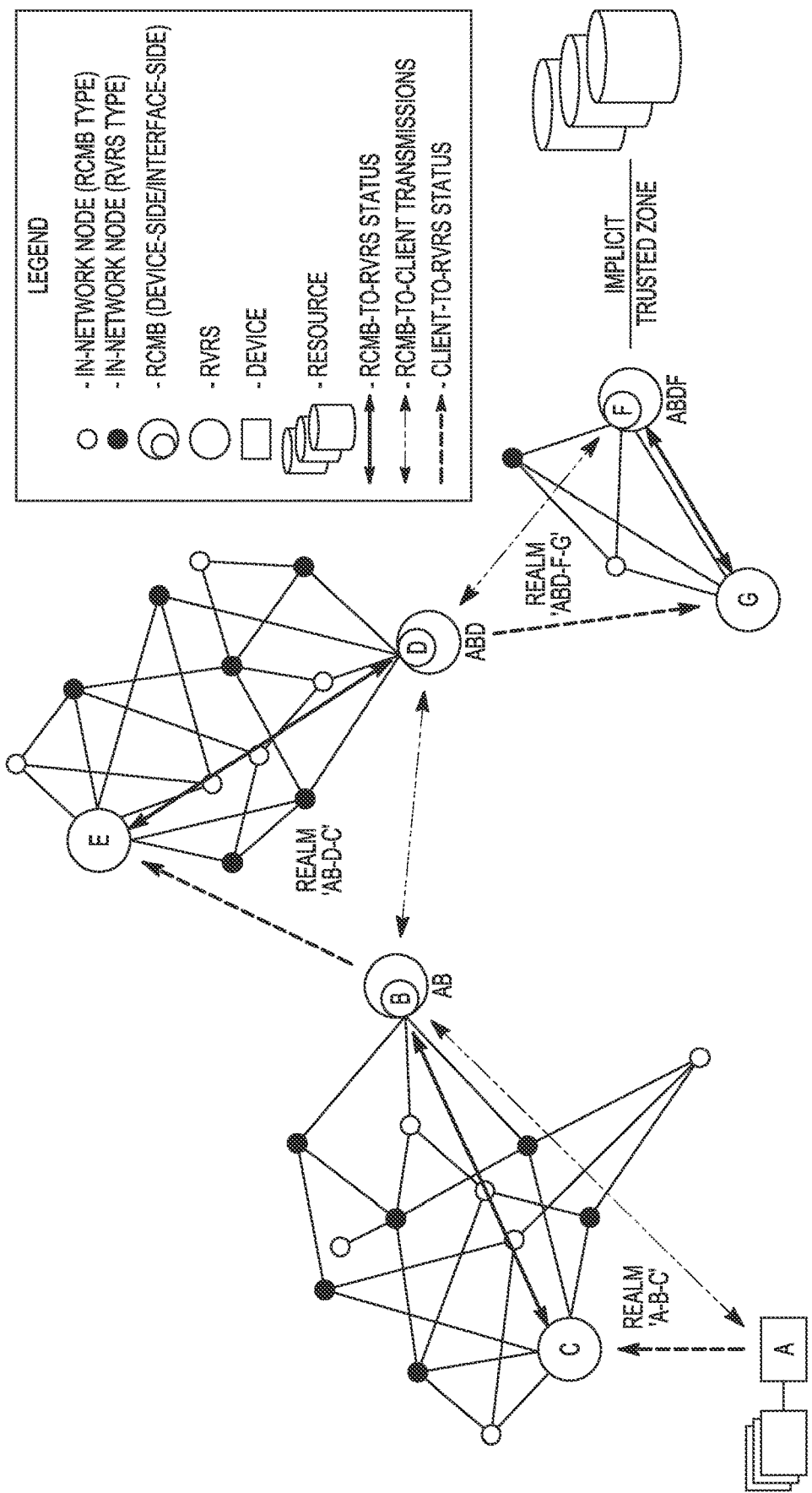
FIG. 23 illustrates a multi-realm with cross-domain isolation.

FIG. 22 illustrates a method to encapsulate data in an instantiation of a multi-realm, and FIG. 23 illustrates a multi-realm with cross-domain isolation. In the embodiments of FIGS. 22 and 23, knowledge of information belonging at a higher security domain is retained at the appropriate RCMB interface (e.g., domain isolation) with only an abstracted representation of networking information being visible in the packet data structure across an internal RCMB interface for a lower security domain. As with other routing solutions, information may be safely encapsulated as encrypted data while in-transit. However, a key difference is that all participating parties in this embodiment must remain known within each respective realm and their identities and associated transactions (e.g., each connection within a given circuit) persist as auditable events chronicled in the ledger. In-Network nodes reside within domain-specific constellations, enabling separate security domains to remain isolated from one another. This property requires that an RCMB be configured as a diode to facilitate the establishment of any cross-domain circuit that would traverse realm boundaries.

Example Set No. 1

Example No. 1

1. A system configured for auditable tamper-resistant remote zero trust access, wherein a given instantiation of the system enables a ternary access control relationships to occur between mobile clients, connection management brokers, and a distributed access control and authentication service, wherein multiple instantiations are chainable in succession enabling the formation and management of secure circuit paths for the in-network routing of data packet traffic between nodes within a peer-to-peer network and between two or more otherwise distinct peer-to-peer networks, the system comprising:
   a decentralized data store configured to implement a permissioned ledger, whereby participating computing nodes form a distributed peer-to-peer application and one or more processors execute instructions to:
      create unique non-fungible digital identities from a given unique pairing of user-unique identifiable feature(s) and device-unique identifiable feature(s), whereby access privileges are a composite of the access rights associated with the: (i) unique user, (ii) unique device, and (iii) a unique user using a unique device; (the formation of a persistent routing circuit occurs as a function associated with the non-fungible digital identity (NFDI) being paired with an interface belonging to an intermediate broker via a contextual transaction. Access is verified further against a given resource-specific gateway).

create unique non-fungible digital identities from a pairing of an existing non-fungible digital identity with connection management broker-unique identifiable feature(s), whereby access privileges are a composite of the access rights associated with the: (i) unique non-fungible digital identity, (ii) unique connection management broker, and (iii) a unique non-fungible digital identity at a unique connection management broker interface; (This allows a special use-case for when a circuit will traverse between two distinct security domains of different levels, each operating with a separate distributed ledger. In such a cross-domain scenario, a new NFDI must be generated within the 'high-side' domain, by pairing an existing NFDI from the 'low-side' domain to an interface on the intermediate resource-specific gateway. This enables rules enforcement by the broker serving as the bridge between the 'low-side' and 'high-side' domains.)
      check for the existence and/or status of a digital asset to include non-fungible digital identities within the ledger; (This feature records contextual transactions involving non-fungible digital assets into a distributed ledger that implements a blockchain in order to establish and manage in-network routing circuits. This facilitates non-repudiation and auditability of transactions and both establishes chain of ownership over digital assets and the correct execution of automated smart contracts.)
      chronicle the chain-of-ownership of digital assets;
      records transactions involving digital assets and resource-specific gateways to include those contextual transactions pertaining to ownership and/or the formation and management of one or more dynamic circuit paths for the purposes of enabling the routing of encrypted and/or encapsulated packet traffic associated with access to resources; (Circuits may be considered as logically persistent, in that they exist for as long as they are required and until they are deleted/removed/modified in accordance with a rule or policy. The path of a given persistent circuit matters, even if individual participating nodes may themselves have roaming addresses. In this manner, permissions may be defined according to not simply a user and a device, but also by what chain of intermediate nodes that user on a device took to reach a given resource-specific gateway. The NFDI is the technology that enables contextual transactions to occur, which enables circuit creation and facilitates access control. These NFDI and associated transactions are what is recorded in the ledger. A given broker may participate in multiple ternary relationships at any point in time, and so may perform as both 'broker' and 'client' simultaneously, depending on the context. This property in combination with the use of connectionless protocols enables the roaming of addresses during a single active session for both clients and brokers. It enables the creation of dynamic routing circuits that are tolerant of both disruption and delays.)
      record metadata on digital assets, to include access caveats and/or status pertaining to connections associated with resource-specific gateways for one or more resources, such as: (i) networks, (ii) data, (iii) services, (iv) applications, (v) services, and/or (vi) assets, inclusive of peer-to-peer nodes;
      manage one or more control channels contained internally to the data store and/or linked externally to the data store using outside pointers for the purpose of enforcing logical separation between instruction sets intended for conditional and/or exclusive use within distinct security domains by specifically-permissioned computational nodes;

a mobile client computational node, is remote from the connection management broker and the access control and authentication service, comprising a first computing platform including:

a first memory configured to store one or more private cryptography keys securely which are then managed under the control of a connection management application that is configured to:

require user login using application-specific, device-specific, and/or token-specific credentials, whereby a successful local attestation from first secure root of trust may also be required;

provide for the secure deletion of private keys both manually and automatically based on: (i) signals from a first secure root of trust, (ii) signals from one or more sensors, and/or (iii) messages remotely received from the access control and authentication service;

provide for the generation of private keys and/or the import of private keys via the I/O interface and/or network interfaces;

communicate over a network that may include the internes using manually entered connection information or preconfigured connection profile to: (i) gateway enumeration server, (ii) access control and authentication service, and/or (iii) resource-specific gateway; and a first secure root of trust configured to:

provide local and remote attestation services concerning the integrity of the client computational node; and one or more I/O interface(s);

one or more sensor(s) and associated hardware, firmware, and software, whereby the implementation of the sensor suite may include one or more of the following: chemical-aware, electromagnetic, motion/acceleration, shock/pressure, temperature sensor, and/or other sensor(s);

one or more virtual, physically wired, and/or wireless network interfaces;

a first set of one or more processor(s) in communication with the first memory, one or more I/O interfaces, one or more network interfaces, one or more sensor(s), and the first secure root of trust, wherein said processor(s) are configured to execute instructions to:

receive local user inputs and/or local or remotely loaded enterprise configuration profile for the secure configuration of the device to include sensor(s) and secure root of trust; and provide for private keys to be accessible during communications and authentication processes;

a connection management broker, is remote from the client computational node(s) and the access control and authentication service, comprising a second computing platform including: (The automated ternary relationship between a client, a broker, and the distributed access control and authentication service, which exists at each incremental stage throughout a given persistent circuit, enables several features. It permits dynamic adjustments in the path of that circuit. It allows automated permissions checking of clients during dynamic adjustments of circuit paths when those circuit need to cross into different security domains. It enables many of the downstream security innovations that are only possible within the context of a managed cloud-based access control and authentication service that spans across multiple security domains boundaries where specific knowledge concerning subject resources remains isolated from said service.)

a second memory configured to store one or more private cryptography keys securely under the control of a management application;

a second secure root of trust configured to:

provide local and remote attestation services concerning the integrity of the connection management broker; and one or more virtual, physically wired, and/or wireless network interfaces; and a second set of one or more processor(s) in communication with the second memory, one or more network interfaces, and the second secure root of trust, wherein said processor(s) are configured to execute instructions to:

communicate with client computational nodes and client connection management brokers, other connection management brokers, and access control and authentication routing services, participate as an in-network node in a peer-to-peer distributed network, participate in consensus activities applicable to the distributed ledger;

execute policy enforcement concerning access to resources, to include one or more resources, such as: (i) networks, (ii) data, (iii) services, (iv) applications, (v) services, and/or (vi) assets, inclusive of peer-to-peer nodes, execute policy enforcement activities as an intermediate node within a routable circuit, execute relay services as an intermediate node within a routable circuit, execute policy enforcement activities as a resource-specific gateway;

an access control and authentication routing service, is remote from the client computational nodes) and the connection management broker, comprising a third computing platform including:

a third memory configured to store one or more private cryptography keys securely under the control of a management application, a third secure root of trust configured to provide local and remote attestation services, one or more virtual and/or physically wired and/or wireless network interfaces, and a third set of one or more processor(s) in communication with the third memory, one or more network interfaces, and the third secure root of trust, wherein said processor(s) are configured to execute instructions to:

execute policy decisions regarding access control and authentication of users, client computational nodes, and connection management brokers, and access to one or more resources, such as: (i) networks, (ii) data, (iii) services, (iv) applications, (v) services, and/or (vi) assets, inclusive of peer-to-peer nodes, participate as an in-network node in a peer-to-peer distributed network, participate in consensus activities applicable the distributed ledger, execute smart contracts and bundling of contextual transactions for recording to a distributed ledger, execute management services for the establishment and administration of routable circuits, execute management services for the distributed ledger, digital assets, and the peer-to-peer distributed network, execute smart contracts in accordance with rules and caveats defined within control channels recorded in a distributed ledger.

Example No. 2 includes the features of Example No. 1, and further optionally includes one or more: (i) client computational node(s), (ii) connection management broker(s), and access control and authentication routing service node(s).

Example No. 3 includes the features of Example Nos. 1-2, and further optionally includes wherein each instantiation may: (i) share usage of a single common permissioned ledger, (ii) exclusively retain use of an instantiation-specific permissioned ledger, or (iii) a hybrid approach involving a mix of both (i) and (ii).

Example No. 4 includes the features of Example Nos. 1-3, and further optionally includes wherein connection management broker(s) and nodes that comprise the access control and authentication routing service are permissioned members of a peer-to-peer distributed blockchain network where the decentralized ledger may: (i) implement a blockchain, (ii) incorporate use of smart contracts, and (iii) incorporate use of pointers to addresses located outside of the ledger.

Example No. 5 includes the features of Example Nos. 1-4, and further optionally includes wherein distinct control channel(s) exist within a given permissioned ledger for each applicable security domain, and the management of dynamic circuits across a given cross-domain interface is governed as a function of the most restrictive ruleset applicable to that cross-domain interface, Each control channel may be encrypted using private and/or shared cryptography.

Example No. 6 includes the features of Example Nos. 1-5, and further optionally includes wherein information belonging at a higher security domain is retained at the appropriate interface and only an abstracted and/or encrypted representation of information belonging to a higher security domain, to include address and routing information, remains visible in the packet data structure across a cross-domain interface for a lower security domain.

Example No. 7 includes the features of Example Nos. 1-6, and further optionally includes wherein the automated decision management over dynamic circuits to include the creation, routing, rerouting, and/or termination of individual circuits, is based on performance and security considerations such as: (i) flow control, (ii) operational considerations, (iii) status interrupts, (iv) temporal/spatial, (v) environmental, and/or (vi) other conditional factors.

Example No. 8 includes the features of Example Nos. 1-7, and further optionally includes wherein the automated decision management process governing control over dynamic circuits and in-network participating nodes may be AI-driven and/or provided by a centralized or decentralized management application.

Example Set No. 2

Example No. 1 is a process including receiving, into a distributed cloud-based access control, authentication, and routing service associated with a peer-to-peer blockchain network, data from a computer device, wherein the distributed cloud-based access control, authentication, and routing service is configured to execute policy decisions regarding access to a resource; and receiving, into a connection management broker, data from the distributed cloud-based access control, authentication, and routing service, wherein the connection management broker is configured to execute policy enforcement regarding access to the resource, thereby providing access to the resource via an implicit trust zone;

wherein connections among the computer device, distributed cloud-based access control, authentication, and routing service, and the connection management broker comprise an untrusted zone;

wherein the distributed cloud-based access control, authentication, and routing service has no access or visibility to the resource; and wherein upon a roaming by the computer device or the connection management broker across multiple access points, the computer device provides a status of the computer device to the distributed cloud-based access control, authentication, and routing service, the connection management broker provides a status of the connection management broker to the distributed cloud-based access control, authentication, and routing service and to one or more clients of the connection management broker, and the distributed cloud-based access control, authentication, and routing service provides a status of the distributed cloud-based access control, authentication; and routing service and one or more clients of the distributed cloud-based access control, authentication, and routing service to the connection management broker. (The formation of a routing circuit occurs as a function associated with the non-fungible digital identity (NFDI) being paired with an interface belonging to an intermediate broker via a contextual transaction. Access is verified further against a given resource-specific gateway. Circuits may be considered as logically persistent, in that they exist for as long as they are required and until they are deleted/removed/modified by policy. The path of a given persistent circuit matters, even if individual participating nodes may themselves have roaming addresses. In this manner, permissions may be defined according to not simply a user and a device, but also by what chain of intermediate nodes that user on a device took to reach a given resource-specific gateway. The NFDI is the technology that enables contextual transactions to occur, which enables circuit creation and facilitates access control. These NFDI and associated transactions are what is recorded in the ledger. A given broker may participate in multiple ternary relationships at any point in time, and so may perform as both 'broker' and 'client' simultaneously, depending on the context. This property in combination with the use of connectionless protocols enables the roaming of addresses during a single active session for both clients and brokers. It enables the creation of dynamic routing circuits that are tolerant of both disruption and delays.)

Example No. 2 includes the features of Example No. 1, and further optionally includes wherein the policy decisions comprise one or more of a right of a user to access the resource, a right of the computer device to access the resource, and a right of the user to use the computer device.

Example No. 3 includes the features of Example Nos. 1-2, and further optionally includes wherein the policy enforcement comprises one or more of verifying that the connection management broker is registered with the a distributed cloud-based access control, authentication, and routing service, that a user is authorized to be connected to the connection management broker and that the user can access the resource, that the computer device is authorized to be connected to the connection management broker and is authorized to access the resource, that a user is using a specific computer device in order to access the connection management broker and a resource of the connection management broker, and that a connection management broker acting as a client is able to access a second connection management broker.

Example No. 4 includes the features of Example Nos. 1-3, and further optionally includes wherein the status provided to the distributed cloud-based access control, authentication, and routing service router by the computer device or the connection management broker comprises an address.

Example No. 5 includes the features of Example Nos. 1-4, and further optionally includes wherein the router and the connection management broker comprise a data store, and wherein the data store comprises of a permissioned ledger that implements a blockchain that incorporates one or more smart contracts; and wherein the permissioned ledger is distributed between participating nodes in a peer-to-peer blockchain network.

Example No. 6 includes the features of Example Nos. 1-5, and further optionally includes receiving, into a second distributed cloud-based access control, authentication, and routing service, data from a second computer device, wherein the second a distributed cloud-based access control, authentication, and routing service is configured to execute policy decisions regarding access to a second resource; and receiving, into a second connection management broker, data from the second a distributed cloud-based access control, authentication, and routing service, wherein the second connection management broker is configured to execute policy enforcement regarding access to the second resource, thereby providing access to the second resource via a second implicit trust zone, such that the computer device does not have access to the second resource and the second computer device does not have access to the resource.

Example No. 7 includes the features of Example Nos. 1-6, and further optionally includes wherein the connection management broker and the second connection management broker have access to a third distributed cloud-based access control, authentication, and routing service, thereby generating a third implicit trust zone.

Example No. 8 includes the features of Example Nos. 1-7, and further optionally includes wherein the router is remote from the network, the computer device is remote from the network and mobile, and the connection management broker is capable of roaming.

Example No. 9 includes the features of Example Nos. 1-8, and further optionally includes wherein the resource comprises one or more of data, an asset, an application, and a service facilitated by the connection management broker.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second." and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process comprising:
   receiving, into an instance of a distributed remote virtual routing service (RVRS), device address data from a computer device, the device address data indicating a current device address of the computer device;
   storing, by the instance of the RVRS, the device address data into a distributed ledger, the distributed ledger populated by multiple RVRS instances;
   providing, by the instance of the RVRS, the device address data, to a roaming connection management broker (RCMB) communicatively coupled to the computer device;
   receiving, into the instance of the RVRS and responsive to the RCMB roaming to a new address, access point (AP) address data from the RCMB, the AP address data indicating a current address of the RCMB;
   storing, by the instance of the RVRS, the AP address data into the distributed ledger;

receiving, into a second instance of the RVRS, authentication data from the computer device and a request to access a resource through the RCMB, the request indicating the device address;

determining, by the second instance of the RVRS, the distributed ledger includes the device address and the device address is associated with a coupling to the RCMB;

issuing, by the second instance of the RVRS and to the RCMB, a policy decision indicating the computer device has permissions to access a resource resulting in an access decision;

receiving, into the second instance of the RVRS, data from a second computer device, wherein the second instance of the RVRS is configured to execute second policy decisions regarding access to a second resource; and receiving, into a second of RCMB, data from the instance of second RVRS, wherein the second RCMB is configured to execute second policy enforcement regarding access to the second resource, thereby providing access to the second resource via an implicit trust zone, such that the computer device does not have access to the second resource and the second computer device does not have access to the resource.

2. The process of claim 1, further comprising:
performing, by the RCMB, policy enforcement, wherein the policy enforcement comprises one or more of verifying that the RCMB is registered with the instance of RVRS, that a user is authorized to be connected to the RCMB and that the user can access the resource, that the computer device is authorized to be connected to the RCMB and is authorized to access the resource, that a user is using a specific computer device in order to access the RCMB and a resource of the RCMB, and that the RCMB acting as a client is able to access a second RCMB.

3. The process of claim 1, wherein the instance of the RVRS comprises a data store, and wherein the data store includes a portion of the distributed ledger that implements a blockchain that incorporates one or more smart contracts; and wherein the distributed ledger is distributed between participating nodes in a peer-to-peer blockchain network.

4. The process of claim 1, wherein the RCMB and the second RCMB have access to a third RVRS, thereby generating a third implicit trust zone.

5. The process of claim 1, wherein the multiple instances of the RVRS are remote from a network, the computer device is remote from the network and mobile, and the RCMB is capable of roaming.

6. The process of claim 1, wherein the resource comprises one or more of data, an asset, an application, and a service facilitated by the RCMB.

7. A non-transitory machine-readable medium comprising instructions that when executed by a processor executes a process comprising:
receiving, into an instance of a distributed remote virtual routing service (RVRS), device address data from a computer device, the device address data indicating a current device address of the computer device;
storing, by the instance of the RVRS, the device address data into a distributed ledger, the distributed ledger populated by multiple RVRS instances;
providing, by the instance of the RVRS, the device address data, to a roaming connection management broker (RCMB) communicatively coupled to the computer device;

receiving, into the instance of the RVRS and responsive to the RCMB roaming to a new address, access point (AP) address data from the RCMB, the AP address data indicating a current address of the RCMB;

storing, by the instance of the RVRS, the AP address data into the distributed ledger;

receiving, into a second instance of the RVRS, authentication data from the computer device and a request to access a resource through the RCMB, the request indicating the device address;

determining, by the second instance of the RVRS, the distributed ledger includes the device address and the device address is associated with a coupling to the RCMB;

issuing, by the second instance of the RVRS and to the RCMB, a policy decision indicating the computer device has permissions to access a resource resulting in an access decision;

receiving, into the second instance of the RVRS, data from a second computer device, wherein the second instance of the RVRS is configured to execute second policy decisions regarding access to a second resource; and receiving, into a second of RCMB, data from the instance of second RVRS, wherein the second RCMB is configured to execute second policy enforcement regarding access to the second resource, thereby providing access to the second resource via an implicit trust zone, such that the computer device does not have access to the second resource and the second computer device does not have access to the resource.

8. The non-transitory machine-readable medium of claim 7, wherein the process further comprises:
performing, by the RCMB, policy enforcement, wherein the policy enforcement comprises one or more of verifying that the RCMB is registered with the instance of RVRS, that a user is authorized to be connected to the RCMB and that the user can access the resource, that the computer device is authorized to be connected to the RCMB and is authorized to access the resource, that a user is using a specific computer device in order to access the RCMB and a resource of the RCMB, and that the RCMB acting as a client is able to access a second RCMB.

9. The non-transitory machine-readable medium of claim 7, wherein the instance of the RVRS comprises a data store, and wherein the data store includes a portion of the distributed ledger that implements a blockchain that incorporates one or more smart contracts; and wherein the distributed ledger is distributed between participating nodes in a peer-to-peer blockchain network.

10. The non-transitory machine-readable medium of claim 7, wherein the RCMB and the second RCMB have access to a third instance of the RVRS, thereby generating a third implicit trust zone.

11. The non-transitory machine-readable medium of claim 7, wherein the multiple instances of the RVRS are remote from a network, the computer device is remote from the network and mobile, and the RCMB is capable of roaming.

12. The non-transitory machine-readable medium of claim 7, wherein the resource comprises one or more of data, an asset, an application, and a service facilitated by the RCMB.

13. A system comprising:
a computer processor; and
a memory coupled to the computer processor;

wherein one or more of the computer processor and memory are operable for:

receiving, into an instance of a distributed remote virtual routing service (RVRS), device address data from a computer device, the device address data indicating a current device address of the computer device;

storing, by the instance of the RVRS, the device address data into a distributed ledger, the distributed ledger populated by multiple RVRS instances;

providing, by the instance of the RVRS, the device address data to a roaming connection management broker (RCMB) communicatively coupled to the computer device;

receiving, into the instance of the RVRS and responsive to the RCMB roaming to a new address, access point (AP) address data from the RCMB, the AP address data indicating a current address of the RCMB;

storing, by the instance of the RVRS, the AP address data into the distributed ledger;

receiving, into a second instance of the RVRS, authentication data from the computer device and a request to access a resource through the RCMB, the request indicating the device address;

determining, by the second instance of the RVRS, the distributed ledger includes the device address and the device address is associated with a coupling to the RCMB;

issuing, by the second instance of the RVRS and to the RCMB, a policy decision indicating the computer device has permissions to access a resource resulting in an access decision;

receiving, into the second instance of the RVRS, data from a second computer device, wherein the second instance of the RVRS is configured to execute second policy decisions regarding access to a second resource; and receiving, into a second of RCMB, data from the instance of second RVRS, wherein the second RCMB is configured to execute second policy enforcement regarding access to the second resource, thereby providing access to the second resource via an implicit trust zone, such that the computer device does not have access to the second resource and the second computer device does not have access to the resource.

* * * * *